US005682181A

United States Patent [19]

Nguyen et al.

[11] Patent Number: 5,682,181

[45] Date of Patent: Oct. 28, 1997

[54] METHOD AND DISPLAY CONTROL SYSTEM FOR ACCENTUATING

[75] Inventors: Hung Nguyen, Poway; Lane T. Hauck, San Diego; Robert W. Shaw, Escondido, all of Calif.

[73] Assignee: Proxima Corporation, San Diego, Calif.

[21] Appl. No.: 247,720

[22] Filed: May 23, 1994

Related U.S. Application Data

[63] Continuation-in-part of Ser. No. 237,013, Apr. 29, 1994, Pat. No. 5,459,484, and Ser. No. 235,292, Apr. 29, 1994, abandoned.

[51] Int. Cl.[6] .................................................. G09G 5/08

[52] U.S. Cl. .................................................. 345/158; 345/9

[58] Field of Search .................................................. 345/158, 157, 345/156, 180, 145, 146, 150, 162, 163, 169, 181, 182, 173, 7–9; 348/734, 744, 61, 62, 214, 211; 356/375; 353/122, 28, 42, 43; 434/323, 324, 337

[56] References Cited

U.S. PATENT DOCUMENTS 3,885,096 5/1975 Inuiya .................................. 345/180
4,467,322 8/1984 Bell et al. .................................. 345/145
4,896,291 1/1990 Gest .................................. 345/150
5,115,230 5/1992 Smoot .................................. 345/157
5,191,411 3/1993 Muckerheide .................................. 348/61

*Primary Examiner*—Xiao Wu
*Attorney, Agent, or Firm*—Bernard L. Kleinke; Peter P. Scott

[57] ABSTRACT

A new and improved display control system which includes a logic arrangement for causing auxiliary light information projected from a hand held light generating device upon a projected primary image to be integrated into the primary video image upon command from a user. A display control circuit causes the underlying primary image to be altered to include an accentuating image indicative of the path of travel followed by a spot of auxiliary control light as it is directed by a user via the hand held light generating device. A color control circuit responsive to user input commands enables the accentuating image to be displayed in one of at least eight primary colors. An erase control circuit also responds to user input commands to enable the user entered accentuating images to be deleted selectively individually or in total simultaneously.

12 Claims, 9 Drawing Sheets

METHOD AND DISPLAY CONTROL SYSTEM FOR ACCENTUATING

CROSS REFERENCE TO RELATED APPLICATIONS

This patent application is a continuation-in-part of U.S patent application Ser. No 08/237,013, filed on Apr. 29, 1994, now U.S. Pat. No. 5,459,484, entitled "DISPLAY CONTROL SYSTEM AND METHOD OF USING SAME," and a continuation-in-part of U.S. patent application Ser. No. 08/235,292, filed on Apr. 29, 1994, now abandoned, entitled "METHOD AND DISPLAY CONTROL SYSTEM FOR PANNING," and is related to U.S. patent application Ser. No. 08/003,304, filed Jan. 1, 1993, now abandoned, which is a continuation-in-part of U.S. patent application Ser. No. 07/955,831, filed Oct. 2, 1992, now abandoned in favor of continuation application Ser. No. 08/154,817, filed Nov. 19, 1993, now U.S. Pat. No. 5,489,923, which is a divisional application of U.S. patent application Ser. No. 07/611,416, filed Nov. 9, 1990, now U.S. Pat. No. 5,181,105, which is a continuation-in-part of U.S. patent application Ser. No. 07/433,029, filed Nov. 7, 1989, now abandoned in favor of continuation application Ser. No. 07/683,657, filed Apr. 29, 1991, now abandoned in favor of continuation application Ser. No. 07/901,253, filed Jun. 19, 1992, now abandoned in favor of continuation application Ser. No. 08/158,659, filed Nov. 29, 1993, now U.S. Pat. No. 5,515,079, and further related to U.S. patent application Ser. No. 07/656,803, filed Feb. 14, 1991, now abandoned in favor of continuation application Ser. No. 08/115,522, filed Aug. 13, 1993, now abandoned, which applications are all incorporated herein by reference.

TECHNICAL FIELD

The present invention relates in general to a display control system and method of controlling the display of information images. The invention more particularly relates to a display control system and method of controlling a display to enable information images within a primary video image to be accentuated visually for display presentation purposes.

BACKGROUND ART

There have been many different types and kinds of display control systems for enabling a user to draw attention to a particular aspects of a display image projected upon a screen or like viewing surface. For example, reference may be made to the following U.S. patents: U.S. Pat. Nos. 5,300,983; 5,299,307; 5,287,121; 5,250,414; and 5,191,411.

As disclosed in the foregoing mentioned patents, various pointing devices, graphic tablets and like devices have been employed for drawing attention to particular aspects of a displayed image. For example, a hand held laser light generator has been employed to produce a highly focused beam of light for creating an auxiliary light image on that part of the primary image to be accentuated. In this regard, a user is able to move the laser pointer so that the spot of auxiliary light travels along a desired path from one primary image portion to another.

While such a pointer may have been satisfactory for some applications, its use required the user to point the device continually at that portion of the primary image to be accentuated. Also, the device was limited to a basic function of merely pointing to a single position on the displayed image at any one time.

Therefore, it would be highly desirable to have a new and improved display control system and method for accentuating more than a single primary image position at any one time. Moreover, such a new and improved display control system and method should not require the user to continually direct his or her attention to the task of accentuating the desired portion of the displayed image, even while operating the device in dim lighting conditions.

One attempt at solving the above mentioned problem is disclosed in U.S. Pat. No. 5,191,411. A laser driven optical communication apparatus includes a laser pointer for forming a spot of auxiliary control light on a projected image cooperates with an optical receiver for detecting the spot of auxiliary light reflecting from the projected image. A secondary projector responsive to the receiver then projects a calculated image representation of the path traced out by the spot of auxiliary light as the user moves the pointer from one primary image position to another.

While such a system may permit an auxiliary light image to be superimposed on a projected primary image projected in a substantially continuous manner, such a system has not proven to be entirely satisfactory. In this regard, the system is very expensive as it requires not only the utilization of a primary projector for directing the primary image to the viewing screen, but also a secondary projector for directing the auxiliary image to the viewing screen. Moreover, such a system is very complex and requires not only the mechanical alignment of the projectors, but also the use of a special viewing screen composed of a phosphorous-fluorescent material to enable the reflected spot to have a certain degree of persistence.

Therefore, it would be highly desirable to have a new and improved display control system and method for accentuating selected portions of a primary image without the use of multiple projector or special types of screen materials. Moreover, such a system should be inexpensive and relatively easy to use and set up by non-technical users.

DISCLOSURE OF INVENTION

Therefore, the principal object of the present invention is to provide a new and improved display control system and method of using it to enable one or more portions of a primary video image to be accentuated with an auxiliary light image continuously.

Another object of the present invention is to provide such a new and improved display control system and method of using it to enable accentuating one or more desired portions of the primary image in a fast and convenient manner.

Another object of the present invention is to provide such a new and improved display control system and method of using it, to accentuate selected portions of a primary image without the use of multiple projectors or special types of screen materials.

Another object of the present invention is to provide such a new and improved display control system and method of using it, to enable accentuated portions of a primary image to be normalized either simultaneously or selectively in part by the deletion of one or more accentuating images.

Another object of the present invention is to provide such a new and improved display control system and method of using it to accentuate selected portions of a primary image with an accentuating image having a desired color.

Briefly, the above and further objects of the present invention are realized by providing a new and improved display control system which includes a logic arrangement for causing projected auxiliary light information generated by a hand held light wand to be integrated into a primary video image upon command from a user. A display control circuit causes the underlying primary image to be altered to include an accentuating image indicative of the path of travel followed by a spot of auxiliary control light as it is directed by a user via the hand held light wand. A color control circuit responsive to user input commands enables the accentuating image to be displayed in one of a plurality of different colors. An erase control circuit also responds to user input commands to enable the user entered accentuating images to be deleted selectively individually or in total simultaneously.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
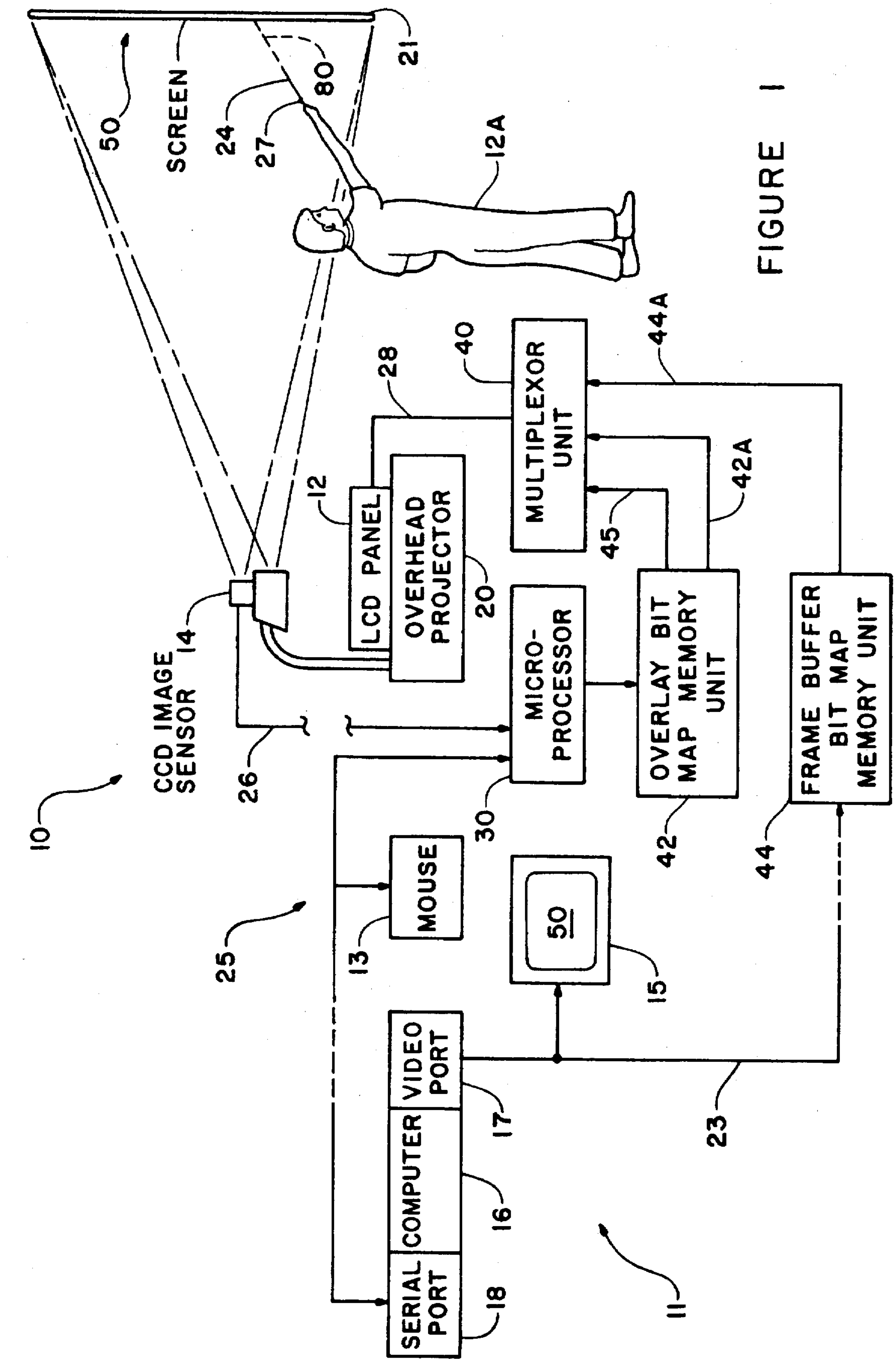
FIG. 1 is a block diagram of a display control system which is constructed in accordance with the present invention.

Referring now to the drawings, and more particularly to FIG. 1 thereof, there is shown a display control system 10 which is constructed in accordance with the present invention. The display control system 10 is illustrated connected to a computer system 11 having a personal computer 16 and peripheral devices including a computer mouse 13, a video monitor 15, and a liquid crystal display panel 12 mounted on an overhead projector 20. A video output port 17 in the personal computer 16 supplies via a video cable 23 primary video information signals indicative of a primary video image 50 to the video monitor 15 and the liquid crystal panel 12 simultaneously. The display control system 10 in accordance with the method of the present invention can, upon the command of a user, alter the primary video image 50 projected by the liquid crystal display projector 20 to include an auxiliary or accentuating video image 52 (FIG. 9) for accentuating desired portions of the primary video image displayed. More particularly, as more fully disclosed in copending U.S. patent application Ser. No. 07/829,916, a signal processor 25 responsive to a charge couple device image sensor or camera 14, processes auxiliary light information generated by a hand held light wand or light generating device 24 to generate an auxiliary light video image 80 which in turn, as more fully described herein, is converted to an image accentuating signal via the display control system 10 to cause the accentuating video image. It should be understood that the image sensor 14 may alternatively be located in other locations, such as preferably on the LCD panel 12 as disclosed in greater detail in the foregoing patent applications incorporated herein by reference.

The display control system 10 generally includes a microprocessor 30 that controls the display of auxiliary information. In this regard, the display control system 10 has at least four different modes of operation for controlling the display of auxiliary information, including a DRAW mode, an ERASE mode, an ERASE ALL mode and a COLOR SELECT mode, each of which will be described hereinafter in greater detail.

The display control system 10 also includes a 2:1 multiplex unit 40 for supplying the liquid crystal display panel 12 with RGB video data via a data cable 28. In this regard, depending upon the commands received, the RGB video data supplied to the panel 12 is either similar to the RGB video data generated by the personal computer 16 or is modified RGB video data that includes auxiliary video data for accentuating selected portions of the primary video image or for displaying menu information.

A pair of bit-map memory units, an overlay bit-map memory unit 42 and a frame buffer bit-map memory unit 44, receive, store and retrieve auxiliary video information data and primary video information data respectfully in accordance with the method of the present invention.

The memory units 42 and 44 each contain RGB video information that is mapped into a matrix array that corresponds to the video image to be displayed. More specifically, the liquid crystal display panel 12 has a matrix array of 1024 by 768 pixel element. The individual ones of the pixel elements are coupled to the multiplex unit 40 and are energized on and off in accordance with the output signals generated by the multiplex unit 40.

Although a 1024 by 768 pixel array is described, it will be understood that other arrays, such as a 640 by 480 array, may be employed.

In a NORMAL mode of operation with none of the different modes of operation being selected, no information is stored in the overlay unit 42. Accordingly, a GATE control signal 45 from the overlay bit map memory unit 42 remains at a logic LOW level permitting the data retrieved from the bit map memory unit 44 to be transferred to the multiplex unit 40 via a frame buffer data cable 44A.

In the DRAW mode of operation, information may or may not be stored in the overlay unit 42. The absence of stored data in the overlay bit map memory unit 42 for any given memory address will cause the GATE control signal 45 to remain at a logic LOW level permitting the data retrieved from the frame buffer unit 44 to be transferred to the multiplexor unit 40. Conversely, the presence of stored data at any given address in the overlay unit 42 will cause the GATE control signal 45 to be at a logic HIGH level. Thus, for each memory location in the overlay unit 42 with active information will be transferred to the multiplexor 40 via an overlay data cable 42A in place of the video information stored in the corresponding memory location in the frame buffer bit map memory unit 44. Alternately, when a memory location in the overlay memory unit 42 does not contain active information, the information in the corresponding memory location in the frame buffer bit-map memory unit 44 will be transferred to the multiplexor unit 40.

As will be explained hereinafter in greater detail, the effect of the absence or presence of data in the overlay memory unit 42 will only be considered when the control system 10 is in the DRAW mode or a MENU mode of operation.

Figure 3:
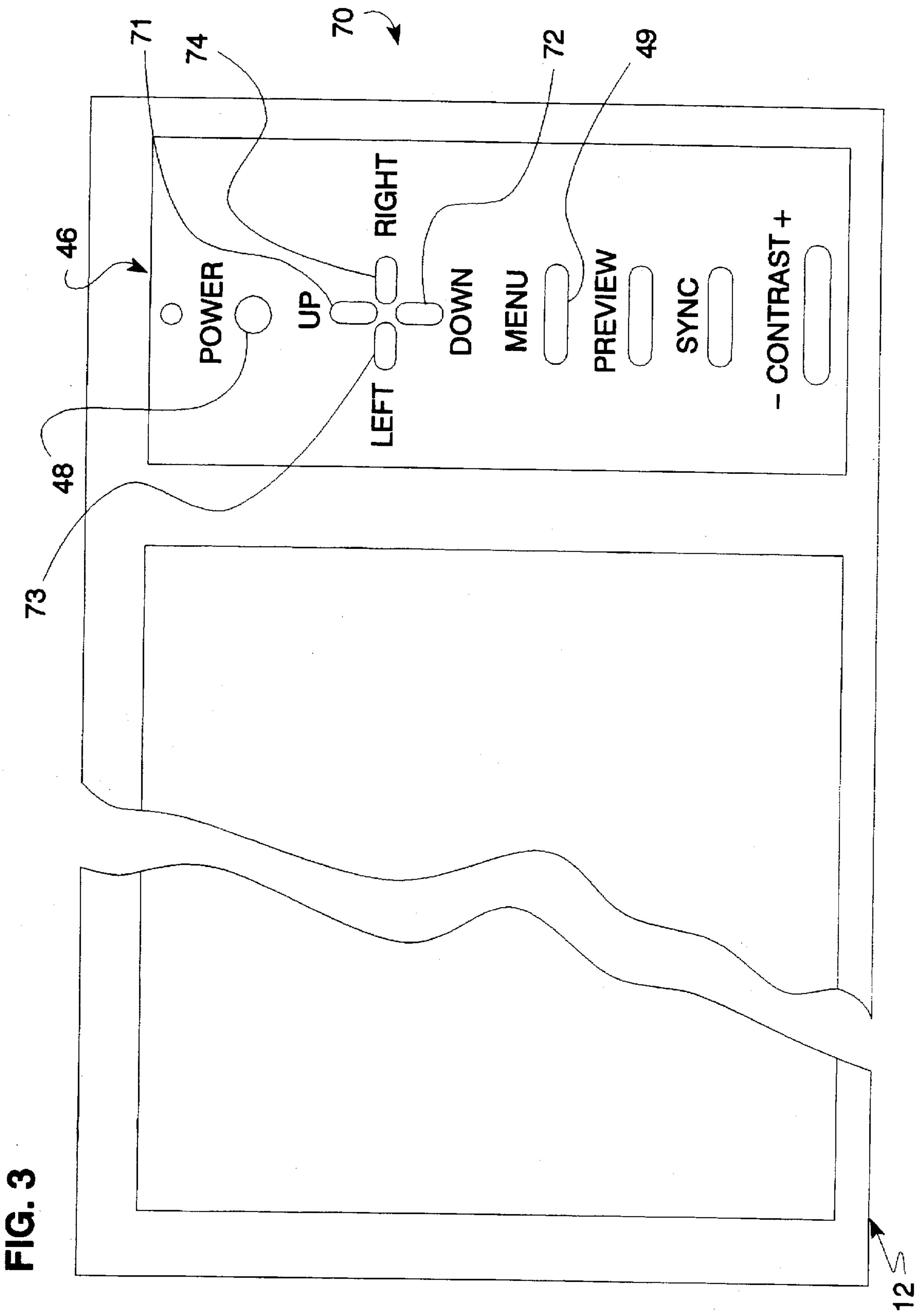
FIG. 3 is a fragmentary top plan view of the liquid crystal display panel of FIG. 1.

In order to enable the user 12A to enter the DRAW mode, the display control system also includes a control panel pad 46 (FIG. 3). The control panel 46 in the preferred embodiment is disposed on the liquid crystal display panel 12. However, those skilled in the art will understand the control panel 46 can be located at other convenient locations, such as on a housing (not shown) for the display control system 10.

Figure 6:
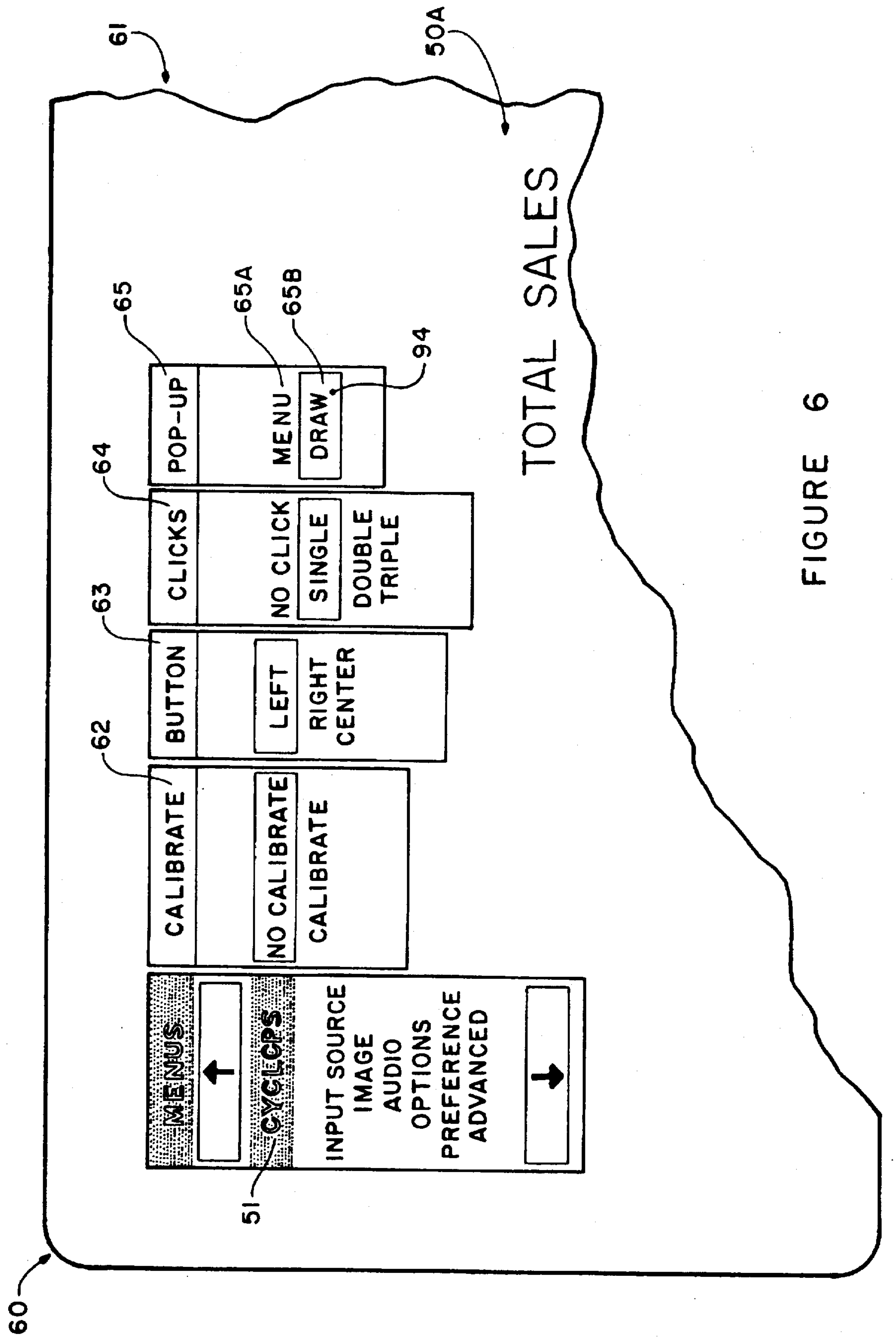
FIG. 6 is a diagrammatic view of a menu window generated by the display control system of FIG. 1.

Considering now the control panel 46 in greater detail with reference to FIG. 6, the control panel 46 includes a set of control switches for helping to control the operation of the display control system 10. In this regard, the control panel 46 includes a power on-off switch 48 for energizing the display control system 10 as well as the liquid crystal display panel 12, and a menu select switch 49 that causes the liquid crystal display panel 12 to display a main menu window 60 (FIG. 6) on the primary projected image, such as an image 50A. A menu control switch indicated generally at 70 includes a set of arrow keys or buttons including an up control key 71, a down control key 72, a right control key 74 and a left control key 73. In this regard, when the user 12A activates the menu switch 49, a top portion of the image projected upon the viewing screen 21 will be overlaid with the main menu window 60. In order to select a desired one of the menu selections, the user activates the control switches 71–74 to move a menu selection bar or cursor 51 to a desired one of the menu items. The menu selection bar 51, when moved, causes the currently selected menu item to be highlighted.

From the foregoing, those skilled in the art will understand the left and right control keys 73 and 74 respectively, cause the selection bar 51 to move across the main menu window 60 to a desired setting, while the up and down control keys 71 and 72 respectively cause the selection bar 51 to move up and down the main menu window 60 to a desired setting.

After the user 12A has positioned the selection bar 51 to a desired setting, the user using either the light wand 24, or the mouse 13, or the control pad 46, as will be explained hereinafter in greater detail, causes the selected menu item to be activated.

The main menu window 60 includes a plurality of different selections including a "Cyclops™" selection 61 which allows the user to set up and control the interactive pointer or light wand 24 and the display control system. When the "Cyclops™" selection 61 is activated, the display control system automatically generates a set of control windows, a calibrate window 62, a button window 63, a click window 64 and a pop-up window 65. The pop-up window 65 includes a "Cyclops™" menu selection 65A and a draw selection 65B. In this regard, when the user selects the draw selection 65B, the main menu window 60 is replaced with a draw window 80 (FIG. 4) and the display control system 10 automatically enters the DRAW mode.

Considering now the draw window 80 in greater detail, the draw window 80 includes a set of tool windows including a draw tool selection window 81, an erase tool selection window 82, an erase all selection window 83, and a color selection window 84.

The draw tool selection 81 allows the user 12A to use the light wand 24 to accentuate desired portions of the primary video image being displayed.

The erase tool selection 82 enables the display control system 10 to be placed in the ERASE mode enabling the user 12A to delete selected ones of the accentuating images previously entered into the overlay memory 42.

The erase all selection 83, enables the user to erase all of the accentuating images previously entered into the overlay memory 42.

Figure 5:
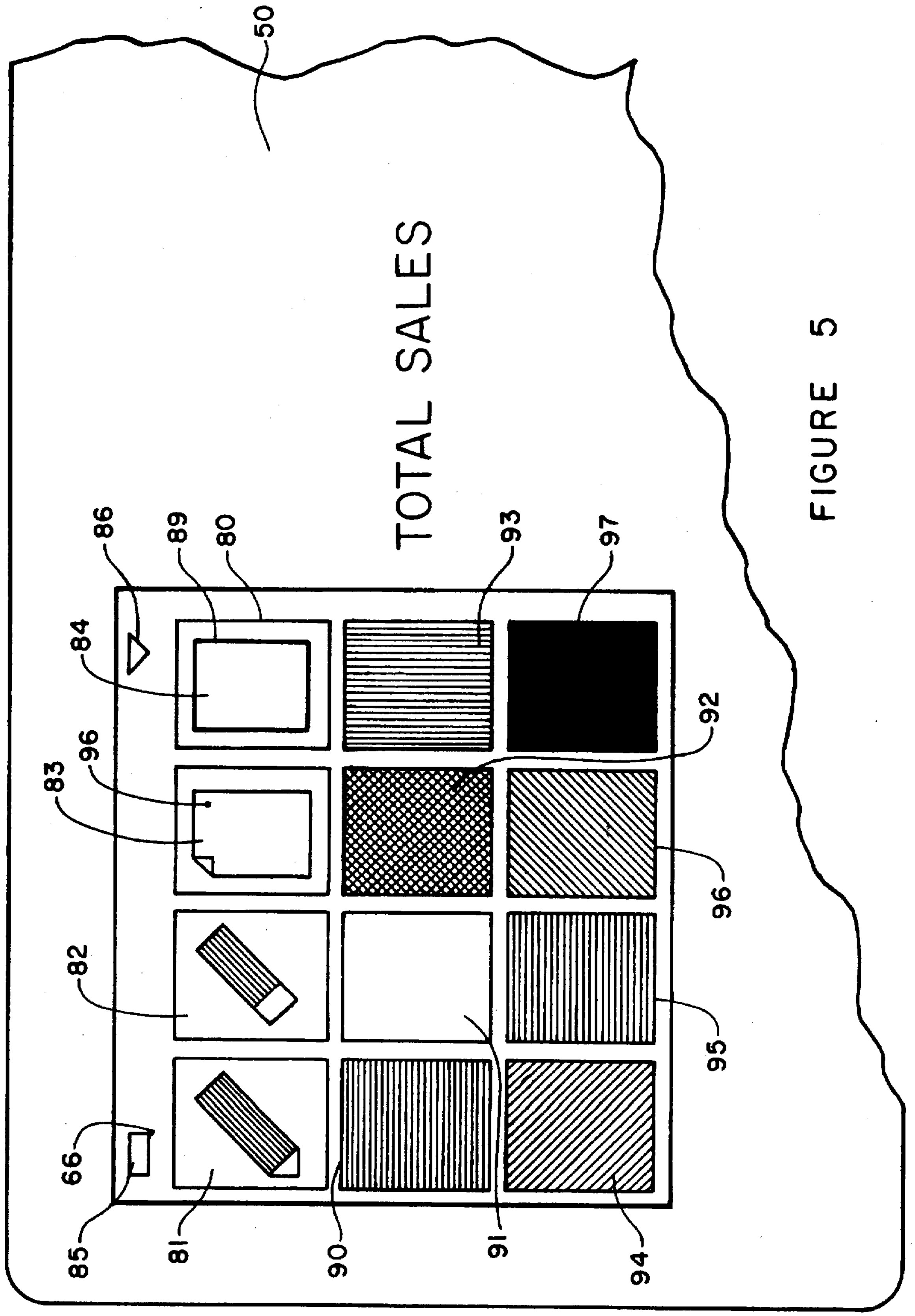
FIG. 5 is a diagrammatic view of another projected primary image illustrating a tool bar with a color palette.

The color selection 84 causes a set of color selection windows 90–97 (FIG. 5) to be displayed below the draw window 80.

Figure 9:
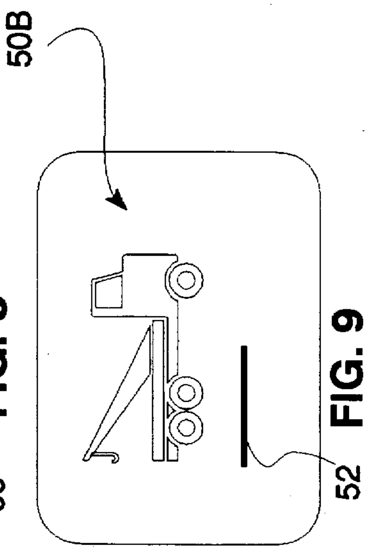
FIG. 9 is a diagrammatic view of the primary video display image of FIG. 8 illustrating the accentuating image formed by the auxiliary light.

Considering now the operation of the display control system 10 in greater detail, in the first mode or DRAW mode of operation a user 12A is enabled to accentuate any portion of a primary video image, such as a primary image 50B (FIG. 7), with an accentuating video image such as the accentuating image 52 (FIG. 9). In this regard, in the DRAW mode, the user causes the hand held light wand 24 to be energized and directs the light generated therefrom to form a spot of auxiliary light 60 on a desired location on the primary image 50B, such as a desired point A. The user 12A then activates the draw mode feature by depressing an activate feature switch 27 on the light wand 24. While the switch 27 is depressed and held down, the user 12A moves the light wand 24 causing the spot of auxiliary light 60 to traverse a desired path of travel from, for example, point A to point B. As the spot of auxiliary light 60 moves towards point B, the display control system 10 generates an image accentuation signal which is indicative of a representative path of travel which, in turn, causes an accentuating image corresponding to the representative path, such as the accentuating image 52 (FIG. 9), to be displayed on the primary image 50B. In this regard, the auxiliary image 52 replaces that portion of the primary image previously defined by a given group of pixel elements that now define the auxiliary image 52.

When the user 12A has completed the desired accentuating, the feature switch 27 is deactivated causing the spot of auxiliary light 60 to be extinguished. In this regard, the microprocessor 30 determines that the auxiliary light 60 has been extinguished at point B and, in turn, terminates the drawing of the underlying image.

Figure 12:
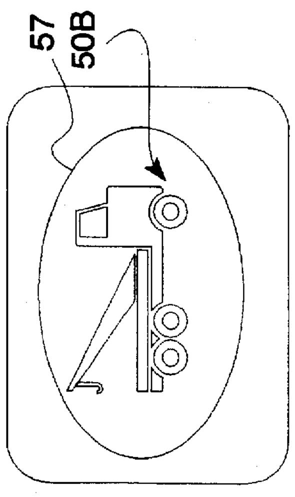
FIG. 12 is a diagrammatic view of the primary video display image of FIG. 8 illustrated another accentuating image.

From the foregoing, it should be understood by those skilled in the art, that the display control system 10 causes the primary image 50B to be altered to include the representative path of travel followed by the spot of auxiliary control light as it traversed from point A to point B. Thus, while in the foregoing example, the path of travel was representative of a straight line, it should be understood that the path of travel can be any path, for example, the path can be a circle as defined by another accentuating image 57 (FIG. 12). In this regard, the user 12A can create an illusion that the light wand 24 was used to draw or write on the projected primary image, such as the image 50B.

In the second mode or COLOR mode of operation, the user 12A is able to select the color of the accentuating image, such as the color of accentuating image 52. In this regard, as will be explained hereinafter in greater detail, in the COLOR mode, the user 12A can select one of N number of different colors for each accentuating image, where N is equal to at least eight different colors. To change the color selection for accentuating images, the user 12A points the light wand 24 toward the projected window 80 to cause a spot of auxiliary control light to be reflected in a desired one of the color selection window, such as in the color selection window 90. The user 12A then activates the tool selection switch 27 which causes the color in the selected window, such as window 90, to be selected.

Figure 10:
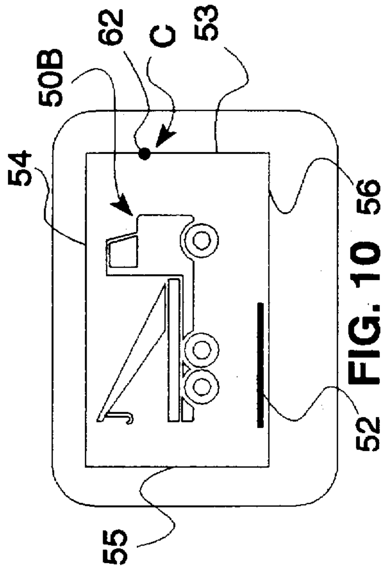
FIG. 10 is a diagrammatic view of the primary video display image of FIG. 8 illustrated with a plurality of accentuating images.
Figure 11:
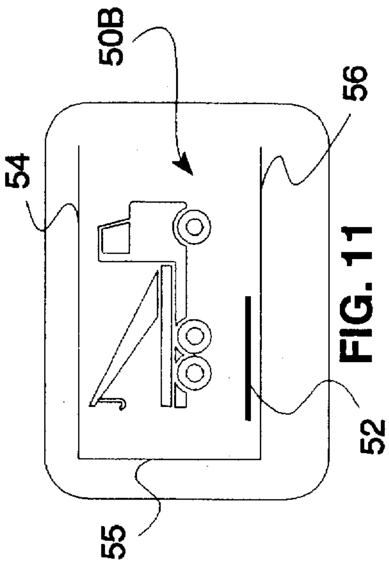
FIG. 11 is a diagrammatic view of the primary video display image of FIG. 10 illustrated with one of the plurality of accentuating images erased.

In the third mode or ERASE mode of operation, the user 12A is able to erase selectively any accentuating image presently displayed on the primary image. In this regard, in the ERASE mode, the user causes the hand held light wand 24 to be energized and directs a spot of auxiliary light 62 to any location on an accentuating image, such as point C on the accentuating image 53. The user 12A then activates the erase mode feature by depressing the activate selected tool switch 27 on the light wand 24. When the switch is depressed, the user moves the light wand 24 causing the spot of auxiliary light 62 to be superimposed on the accentuating image 53 at point C (FIG. 10). The user then deactivates the switch 27 to cause the accentuating image 53 to be deleted as illustrated in FIG. 11. Alternately, in the ERASE mode, any part of an accentuating image may be deleted.

The user then repeats this procedure for each accentuating image to be removed. For example, accentuating image 54, 55 and 56 can also be deleted.

Figure 7:
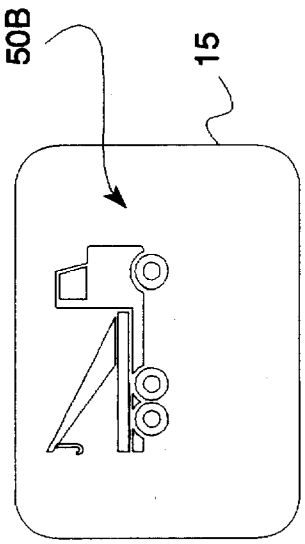
FIG. 7 is a diagrammatic view of a primary video display image illustrated without an accentuating image.
Figure 8:
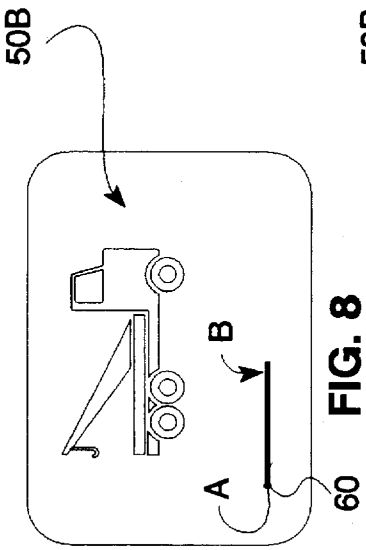
FIG. 8 is a diagrammatic view of the primary video display image of FIG. 7 illustrating an auxiliary light path of travel for forming a single accentuating image.

In the fourth mode or ERASE ALL mode of operation, the user 12A is able to erase all of the accentuating images displayed on a primary image. Thus, for example, in the ERASE ALL mode, all of the accentuating images 52–56 on the primary image 50B as shown in FIG. 10 can be erased simultaneously to restore the displayed image to an unaccentuated image as shown in FIG. 7. In this regard, in the ERASE ALL mode the user 12A causes a tool bar 80 to be displayed on the liquid crystal display panel 12 by depressing a menu key or control button 49 on a control panel 46 forming part of the liquid crystal panel 12. When the menu key 49 is depressed, a menu window 60 is superimposed in the upper portion of the projected primary image, such as the image 50A, as illustrated in FIG. 6. The menu will remain on the projected image 50A until the user 12A depresses the menu key 49 a second time. The display control system 10 will cause the then active menu setting to be automatically stored in the memory (not shown) of the microprocessor 30 so that the next time the menu key 49 is depressed, the last selected menu will be displayed again.

Figure 4:
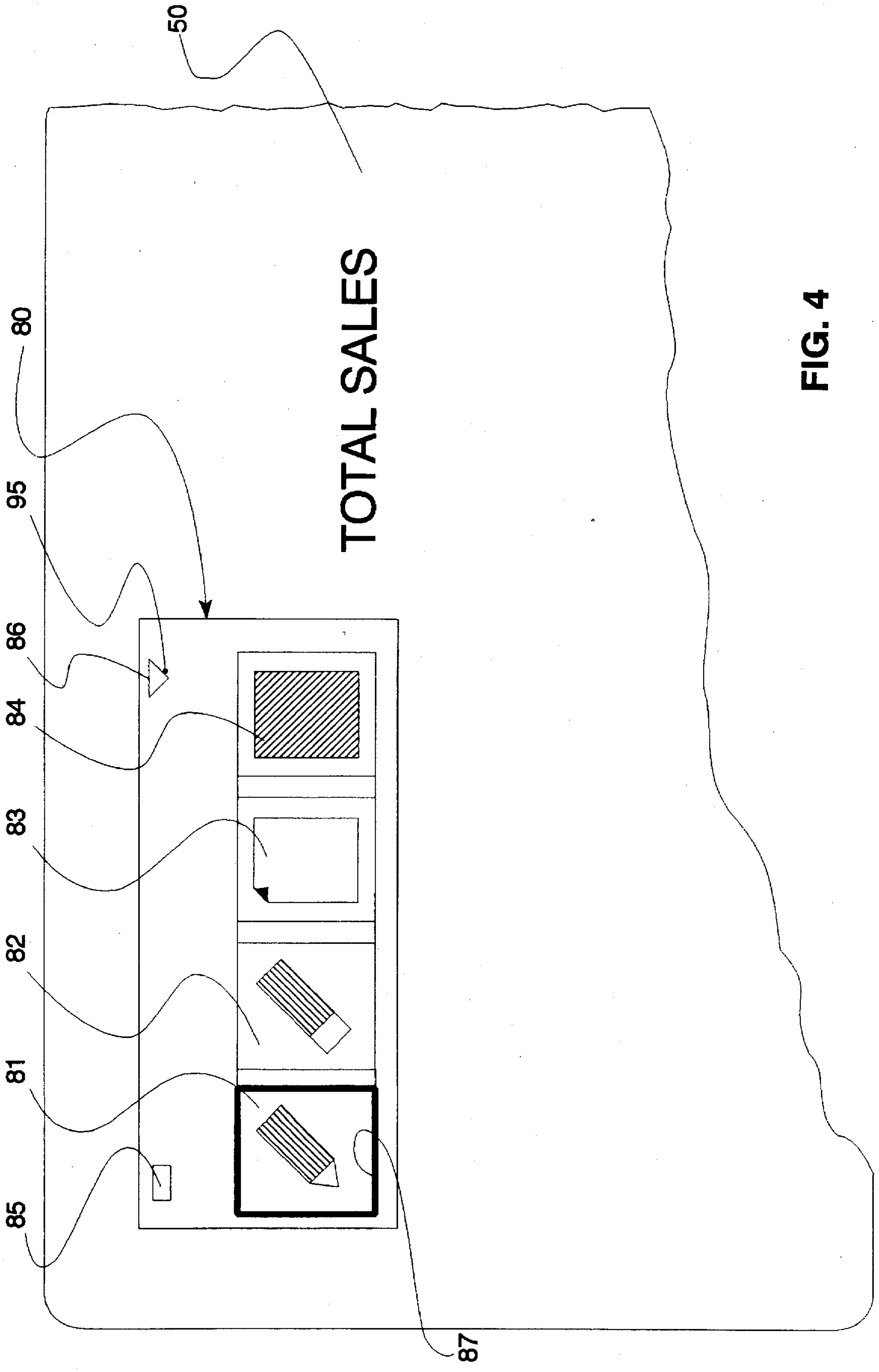
FIG. 4 is a diagrammatic view of a projected primary display image illustrating a tool bar without a color palette.

Once the user activates the menu switch 49, the user selects a Cyclops™ menu feature by using the select or arrow keys 70 on the control panel 46. The user depresses one or more of the arrow keys 71–74 to cause a menu curser 51 to move across the Cyclops menu 61 to a DRAW feature 65B. The user 12A then directs either a spot of auxiliary control light from the light wand 24 to the DRAW window 65B, such as a spot 94 (FIG. 6) and depresses and releases the activate feature switch 27 on the light wand 24 to emulate a mouse CLICK causing the menu window 60 to be replaced with a draw bar window 80 (FIG. 4).

The user 12A then opens or activates the draw bar window 80 by directing another spot of auxiliary control light 95 (FIG. 4) to an activate button image 86 and depresses and releases the switch 27 on the light wand 24 to emulate another mouse CLICK causing the draw bar window features to be made active.

The user then directs another spot of auxiliary control light 96 (FIG. 5) to the ERASE ALL window feature 83 and depresses and releases the switch 27 to emulate another mouse CLICK causing all the accentuating images 52–57 to be deleted from the projected image 50B.

The user then selects another draw bar feature using the light wand 24 or exits the draw feature by depressing the menu switch 49. The last selected feature on the draw bar 80 will be stored when the menu is exited and will be highlighted by an accentuating image, such as an image 87 the next time the draw bar feature is selected.

To close the draw bar feature without exiting the draw bar windows, the user directs another spot of auxiliary control light 66 to a close bar 85 and depresses and releases the light wand switch 27 to emulate another mouse CLICK. Thus, for example, if after the user 12A selects a color, and then clicks the close bar 85, the color selected will be displaced in the color select window 84 and an accenting image, such as the image 89, will be superimposed on the color window 84. After the user 12A has completed making a tool selection and a color selection, the user 12A causes another spot of auxiliary control light to be directed to the close bar 85 in the upper left portion of the draw window 80. The user then activates the selection switch 27 which deletes the displaying of all windows. Thus, only a primary image, such as the primary image 50B is displayed. The user 12A may now utilize the light wand 24 to draw one or more accentuating images on the primary image.

While the above described features have been described as being activated with the light wand 24 emulating a mouse, it should be understood by those skilled in the art, that the selections can also be made with the mouse 13 or the keyboard 19.

Figure 2A:
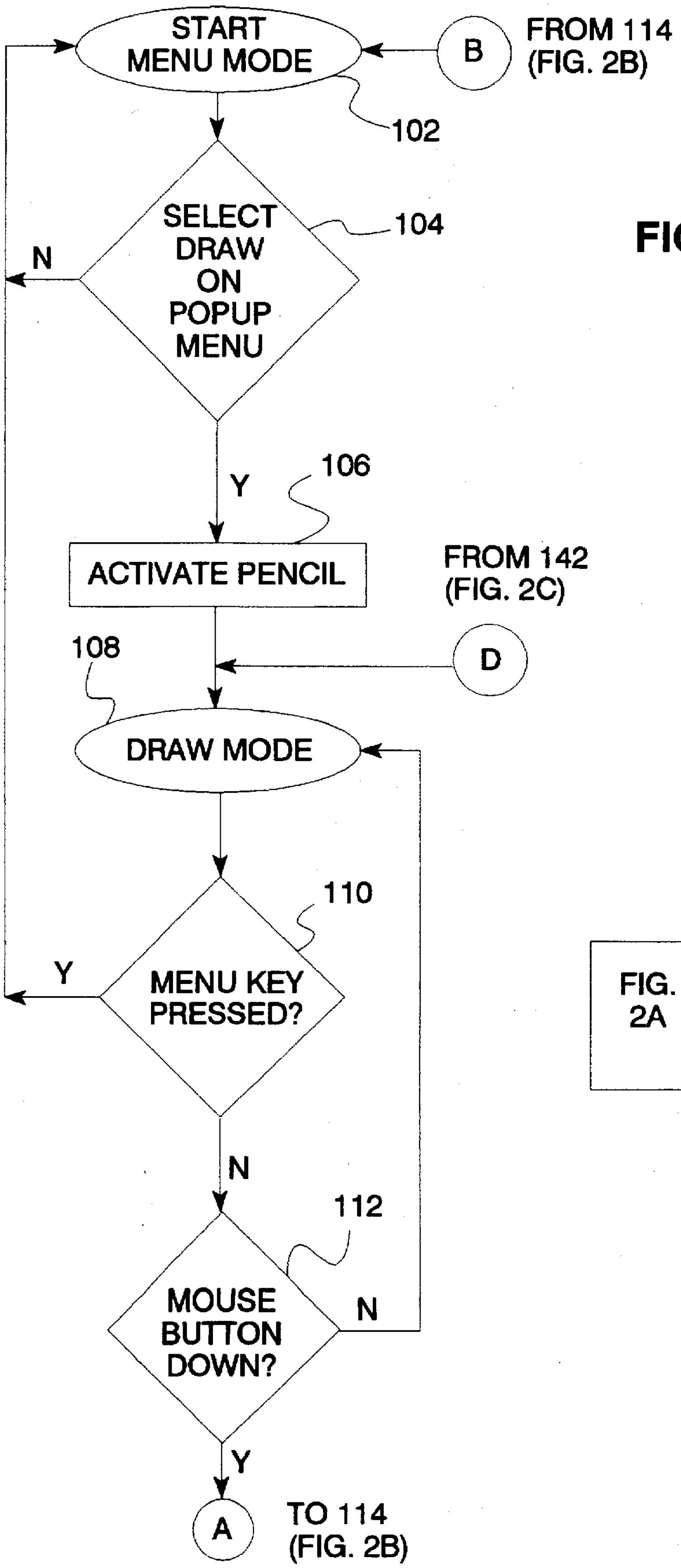
FIG. 2 is a simplified flowchart diagram illustrating the steps executed by the control system of FIG. 1.
Figure 2:
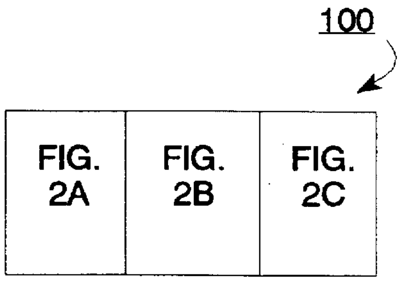

Considering now the operation of the display control system 20 in greater detail with reference to FIG. 2, whenever the user 12A depresses the menu control key 49 the display control system enters the MENU MODE 100 (FIG. 2A) at a program entry instruction 102, the program then advances to a decision instruction 104 to determine whether the user has selected the draw features on the pop-up menu window 64.

If the user has not selected, the pop-up menu window 64, the program returns to the program entry instruction 102 and proceeds as previously described.

At decision instruction 104, if a determination is made that the user 12A selected the pop-up window 65, the program advances to a command instruction 106 which activates the display control system 10 to interact with auxiliary light information produced by the light wand 24.

After activating the system 10 for interaction, the program proceeds to a draw mode instruction 108 that causes the draw mode window 80 to be displayed by the panel 12. The program then advances to a decision instruction 110 to determine whether or not the user 12A has activated the menu selection key 49.

If the user 12A has activated the menu selection key 49, the program returns to the program entry instruction 102 and proceeds as previously described.

If the user 12A has not activated the menu selection key 49, the program advances to a decision instruction 112 to determine whether or not the user has activated the tool switch 27. If switch 27 has not been activated, the program returns to the draw mode instruction 108 and proceeds as previously described.

If the user 12A has activated the tool switch 27, the program goes to a decision instruction 114 (FIG. 2B), to determine whether or not the user 12A elected to close the draw mode window by selecting the close bar 85.

If the user 12A has selected the close bar 85, the program returns to the main menu mode instruction 102. If the user has not elected to close the draw mode, the program advances to a decision instruction 116 to determine whether or not the user has elected to open the draw mode features by selecting the open triangle 86.

At decision instruction 116, if the draw mode was selected, the program goes to a decision instruction 118 to determine whether or not the color select feature was selected. If the palette is not displayed, the program goes to command instruction 121 which causes the color palette windows 90 to 97 to be displayed. If the color palette was displayed, the program goes to a command instruction 120 which causes the color palette windows 90 to 97 to be deleted from the projected image.

From instructions 120 and 121, the program proceeds to a decision instruction 122 to determine whether or not the draw or pencil feature has been selected.

If the pencil feature has been selected at decision instruction 122, the program goes to a command instruction 124 to activate the draw feature commands. After command instruction 124 has been completed, the program proceeds to a decision instruction 126.

If the pencil feature has not been selected at decision instruction 122, the program advances to the decision instruction 126 to determine whether or not the erase feature has been selected.

If it is determined at instruction 126 that the erase feature was not selected, the program advances to a decision instruction 130 to determine whether or not the color selection feature has been selected.

If at decision instruction 126 it is determined that the erase feature was selected, the program advances to a command instruction 128 which activates the erase selective feature. After instruction 128 is executed, the program goes to the decision instruction 130 (FIG. 2C).

At decision instruction 130, if it is determined the color selection feature was selected, the program proceeds to a command instruction 132 which causes the color selection to be changed. The command 132 also causes the color palette windows to be deleted from the display image. The color window 84 will now display the last user selected color. The program then goes to a decision instruction 134 to determine whether a new page is required where all accentuating images are to be deleted.

If at instruction 130 it is determined that the color change selection was not made, the program proceeds to the instruction 134. At instruction 134 if it is determined the erase all feature was selected, the program goes to command instruction 136 which causes all of the accentuating information in the overlay buffer memory unit 42 to be erased.

If the erase all feature was not selected at instruction 134, the program goes to a decision instruction 138 to determine whether or not the light wand 24 is active. If the light wand 24 is active, the program goes to a command instruction 142 that causes an accentuating image to be drawn from the last detected auxiliary light x, y position to the new auxiliary light x, y position. The program then proceeds to a decision instruction 142 to determine whether or not the erase feature is active.

If at instruction 138, it is determined the pencil feature is not active, the program goes to the decision instruction 142 to determine if the erase feature is active.

At decision instruction 142, if it is determined the erase feature is active, the program advances to a command instruction 144 which clears all the overlay bit map memory locations for those pixel elements from the last accentuating image x, y coordinates values to the detected or mouse x, y coordinate values. The program then advances to instruction 108 and proceeds as previously described. Similarly, if it is determined the erase feature was not active, the program also proceeds to instruction 106.

Although in the preferred embodiment of the present invention, the DRAW mode features are described as operating interactively with the light wand 24, it will be understood by those skilled that control codes entered via the mouse 13 or the control pad 46 can also be communicated to the display control system 10 via the RS232 serial port interface 18 to cause the same draw mode commands to be executed.

Figure 2B:
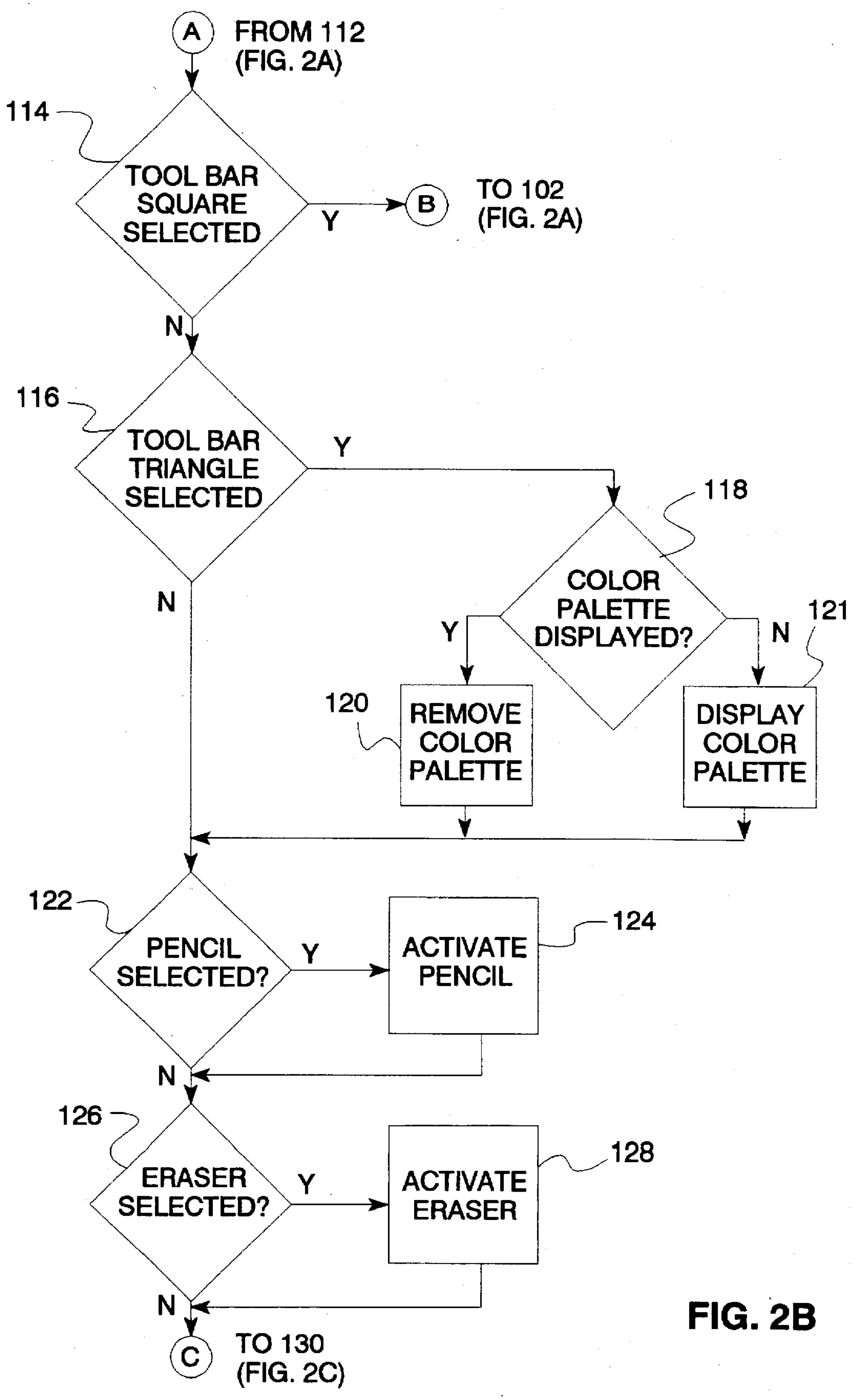
Figure 2C:
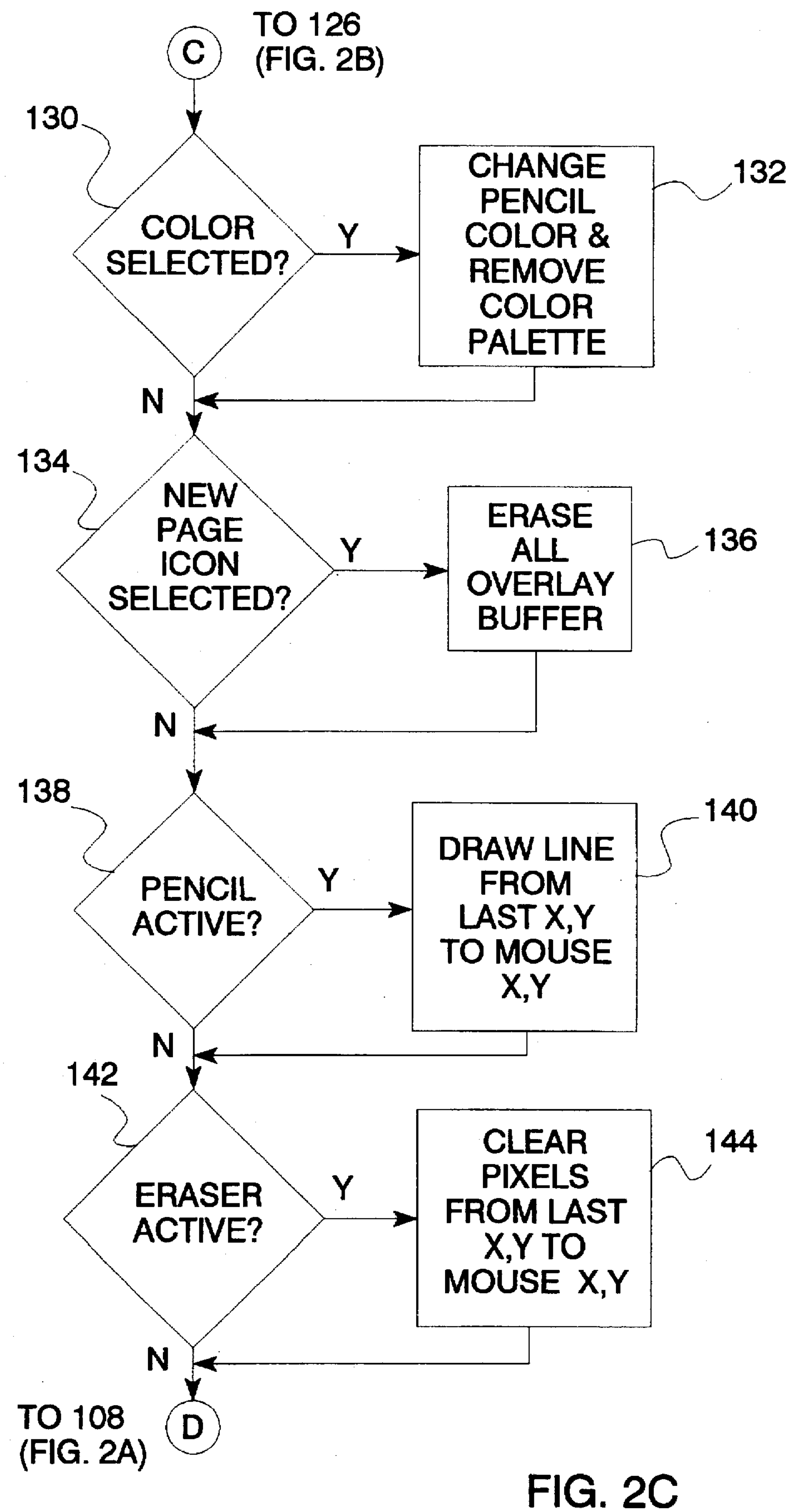

The flow charts described in FIGS. 2A–2C are high level flow charts. Appendix A, attached hereto and incorporated herein, includes a complete source code listing for all of the draw mode commands described herein as well as the operation of the menu feature via the mouse 13, the keyboard 19 and/or the light wand 24.

While particular embodiments of the present invention have been disclosed, it is to be understood that various different modifications are possible and are contemplated within the true spirit and scope of the appended claims. For example, instead of replacing the video image with the accentuating image, a translucent combined image may be formed. There is no intention, therefore, of limitations to the exact abstract or disclosure herein presented.

APPENDIX "A"

```
x.c

/* Excerpt from backgroung loop (nmcmon.c) */

if( MousePFlag )
{
        if( (CycXPos + MouseXPos) >= 0 && (CycXPos + MouseXPos) <= 1023 )
        {
                CycXPos += MouseXPos;
        }
        if( (CycYPos + MouseYPos) >= 0 && (CycYPos + MouseYPos) <= 767 )
        {
                CycYPos += MouseYPos;
        }

        if(SysData.DBG_FLAGS & 0x100)
        {
                Mwin( ((uchar *)(0x200000+((CycXPos&3)<<19)+
                                                        ((CycXPos>>1)&0x1fc)+(CycYPos<<9))) );
        }
        DoPointerEvent( (short)CycXPos, (short)CycYPos, (short)MouseButton );
        MousePFlag = FALSE;
}
/* Menu type definitions (nmmenu.h) */

typedef struct ITEM {

        struct ITEM *nextITEM;
        short   X1,Y1;          /* Item upper left corner relative to menu position */
        short   X2,Y2;          /* Item lower right corner relative to menu position */
        char    *Text[5];       /* Item title in 5 languages */
        ICON  *Icon;            /* Item Icon symbol */
        int     (*func)( void *, struct ITEM *, ushort );       /* Item function */
        int     Attr;                   /* Item attributes (i.e. no select, rectangle enclosed */

} ITEM;

typedef struct MENU {

        struct MENU     *nextMENU;   /* Link to other menus */
        struct ITEM     *item;       /* Link to menu item */
        struct ITEM *SelectItem; /* Current selected item */
        short   X1,Y1;          /* Absolute position of menu upper left corner */
        short   X2,Y2;          /* Absolute position of menu lower right corner */
        char    *Text[5];       /* Menu title in 5 languages */
        short  Width[5];        /* Menu width for each language */
        int     Attr;           /* Item attributes (i.e. toolbar, slidebar, etc */

} MENU;

typedef struct MENUGRP {

        struct MENU     *FirstMenu;             /* Link to first menu */
```

```
                 x.c

        struct MENU     *ActiveMenu;    /* Currently selected menu */
        short  XPos, YPos;                      /* last pointer X,Y position */
        short  Xofs, Yofs;                      /* Distance from menu left corner to cursor */
        short  BoxX1, BoxY1;                    /* Menu move XOR box left corner */
        short  BoxH, BoxW;                      /* Menu move XOR box hieght and width */
        uchar DrawFlag;                         /* Draw menus request */
        uchar EraseFlag;                                /* Erase before draw request */
        uchar C_MenuBkg;                                /* Menu Background color */
        uchar C_MenuBorder;                     /* Menu Border color */
        uchar C_MenuHilite;                     /* Menu Highlight color */
        uchar C_Text;                                   /* Menu Text color */
        uchar C_HiliteText;                     /* Menu Text Highlight color */

    ) MENUGRP;

typedef struct ARROW_KEY_EMULATION (

    uchar Cmd;              /* Virtual key code to be queued */
    uchar   Flags;  /* Arrow key emulation flags, (repeat till clear) */
    int     Time;           /* Queue action time stamp */

    ) ARROW_KEY_EMULATION;

/* Menu attribute bit definitions */

#define A_RECT          0x00001
#define A_REDRAW                0x00002
#define A_DELETE                0x00004
#define A_NOHILT                0x00008
#define A_NOKEY         0x00010
#define A_BALANCE       0x00020
#define A_OPAQUE                0x00040
#define A_BUTTON                0x00080
#define A_SCROLL                0x00100 /* Scrolling items flag*/
#define A_SBAR          0x00200 /* Slide bar type menu */
#define A_CNTR_TEXT     0x00400 /* Center print Menu's text */
#define A_RLKFUNC       0x00800 /* Right/Left arrow key function call enable */
#define A_OK_CANCEL     0x01000
#define A_STATWIN       0x02000
#define A_SMALLFONT     0x04000
#define A_LANG          0x08000
#define A_OS_SBAR       0x10000
#define A_TOOLBAR       0x20000


    /* Toolbar menu and item definitions (nmmenu.def) */

ITEM i_tb15 = (    )TO,110,95,140,125,
    "","","","","",TBar10,doToolBar15,A_RECT );

ITEM i_tb14 = ( &i_tb15,75,95,105,125,
    "","","","","",TBar9,doToolBar14,A_RECT );
```

x.c

```
ITEM i_tb13 = ( &i_tb14,40,95,70,125,
       "","","","","",TBar6,doToolBar13,A_RECT );

ITEM i_tb12 = ( &i_tb13,5,95,35,125,
       "","","","","",TBar5,doToolBar12,A_RECT );

ITEM i_tb11 = ( &i_tb12,110,60,140,90,
       "","","","","",TBar4,doToolBar11,A_RECT );

ITEM i_tb10 = ( &i_tb11,75,60,105,90,
       "","","","","",TBar3,doToolBar10,A_RECT );

ITEM i_tb9 = ( &i_tb10,40,60,70,90,
       "","","","","",TBar2,doToolBar9,A_RECT );

ITEM i_tb8 = ( &i_tb9,5,60,35,90,
       "","","","","",TBar1,doToolBar8,A_RECT );

ITEM i_tb7 = ( IT0,110,25,140,55,
       "","","","","",TBar1,doToolBar7,A_RECT );

ITEM i_tb6 = ( &i_tb7,75,25,105,55,
       "","","","","",TBarClear,doToolBar6,A_RECT );

ITEM i_tb5 = ( &i_tb6,40,25,70,55,
       "","","","","",TBar8,doToolBar5,A_RECT );

ITEM i_tb4 = ( &i_tb5,5,25,35,55,
       "","","","","",TBar7,doToolBar4,A_RECT );

ITEM i_tb3 = ( &i_tb4,130,5,140,15,
       "","","","","",TBarExpand,doToolBar3,A_RECT );

ITEM i_tb2 = ( &i_tb3,20,0,120,20,
       "","","","","",ICO,doToolBar2,A_RECT );

ITEM i_tb1 = ( &i_tb2,5,5,15,15,
       "","","","","",TBarClose,doToolBar1,A_RECT );

MENU Mtbar = ( ME0,&i_tb1,&i_tb1,10,10,155,140-70,
       "","","","","",145,145,145,145,145,A_TOOLBAR );


       /* Popup menu and item definitions (nmmenu.def) */

ITEM idrw2 = (   IT0,BW,I2Y1,W_Mdrw-BW,I2Y2,
       "Draw","Draw","Draw","Draw","Draw",ICO,doDraw,A_LANG );

ITEM idrw1 = (&idrw2,BW,I1Y1,W_Mdrw-BW,I1Y2,
       "Menu","Men[","Menu","Menu","Menu",ICO,doMenu,A_LANG );
```

```
x.c

MENU Mdrw = { ME0,&idrw1,&idrw1,MdrwX1,10,MdrwX2,BB+IZY2,
        "Pop-up","Aufklappmen$f","Menu d$croulant","Desplegable","Menu pop-up",
        130,180,190,180,170,A_LANG|A_RECT};

        /* Pointer device processing (mmenu.c) */
/* ----------------------------------------------------------------------------

        DoPointerEvent() - Process local Cyclops and Mouse data.
-
   ---------------------------------------------------------------------------- */
void DoPointerEvent( short x, short y, short buttons )
{
        MENU    *menu;
        MENU    *OldMenu;
        ITEM    *item;

        int ReturnCode;

        DeleteCursor();

        if( x + 9 > 1023 )
                x = 1023-9;
        if( x-8 < 0 )
                x = 8;          /* limit x */
        if( y+9 > 767 )
                y = 767 - 9;
        if( y-8 < 0 )
                y = 8;          /* limit y */

        MGrp.XPos = x;
        MGrp.YPos = y;

        DrawCursor();

        if( MGrp.BoxW )
        {
                DeleteCursor();
                OVL.PixOp = PIX_XOR;
                OVL.Color = OVL_BLACK;
                Rectangle( MGrp.BoxX1, MGrp.BoxY1, (MGrp.BoxX1+MGrp.BoxW),                (MGrp.BoxY1+MGrp.BoxH) );

                OVL.Color = OVL_WHITE;
                Rectangle( MGrp.BoxX1+1, MGrp.BoxY1+1, (MGrp.BoxX1+MGrp.BoxW)-1,          (MGrp.BoxY1+MGrp.BoxH)-1 );

                DrawCursor();
                OVL.PixOp = PIX_NORMAL;
                if( buttons & SELECT_MASK )
                {
                        MGrp.BoxX1 = MGrp.XPos - MGrp.Xofs;
                        MGrp.BoxY1 = MGrp.YPos + MGrp.Yofs;
                        DeleteCursor();

                                page 4
```

```
        x.c

      OVL.PixOp = PIX_XOR;
      OVL.Color = OVL_BLACK;
      Rectangle( MGrp.BoxX1, MGrp.BoxY1, (MGrp.BoxX1+MGrp.BoxW),
                                                                   (MGrp.BoxY1+MGrp.BoxH) );

      OVL.Color = OVL_WHITE;
      Rectangle( MGrp.BoxX1+1, MGrp.BoxY1+1, (MGrp.BoxX1+MGrp.BoxW)-1,
                                                                   (MGrp.BoxY1+MGrp.BoxH)-1 );

      DrawCursor();
      OVL.PixOp = PIX_NORMAL;
    }
    else
    {
      EraseMenus( MGrp.FirstMenu );
      MGrp.FirstMenu->X1 = MGrp.BoxX1;
      MGrp.FirstMenu->Y1 = MGrp.BoxY1;
      MGrp.FirstMenu->X2 = (MGrp.BoxX1 + MGrp.BoxW);
      MGrp.FirstMenu->Y2 = (MGrp.BoxY1 + MGrp.BoxH);
      DrawOneMenu( &Mtbar );
      MGrp.BoxW = 0;
      MGrp.BoxH = 0;
      MGrp.BoxX1 = 0;
      MGrp.BoxY1 = 0;
    }
    return;
}

/* Do menu mode processing for menus and toolbar here */

if( MON_STATE & BM_MEN )
{
    menu = MGrp.FirstMenu;
    while( menu )
    {
      if( x >= menu->X1 && x <= menu->X2 && y >= menu->Y1 && y <= menu->Y2 )
      {
        if( menu != MGrp.ActiveMenu )
        {
          OldMenu = MGrp.ActiveMenu;
          MGrp.ActiveMenu = menu;
          MGrp.EraseFlag = TRUE;
          DrawOneMenu( OldMenu );
          DrawOneMenu( menu );
          MGrp.EraseFlag = FALSE;
        }
      }
      menu = menu->nextMENU;
    }
    menu = MGrp.ActiveMenu;
    item = menu->item;
    while( item )
    {
      if( x >= menu->X1+item->X1 && x <= menu->X1+item->X2  &&

        page 5
```

```
x.c
                                              y >= menu->Y1+item->Y1 && y <= menu->Y1+item->Y2 )
        {
          /* here if Cyclops x/y position within ITEM rectangle */

                if( buttons & SELECT_MASK )
                {
                 /* here if button down - call item's function */

                        /* Skip menu draw if draw mode */

                        if( !(MON_STATE & BM_DRW) )
                        {
                                menu->SelectItem = item;
                                DrawActiveMenu( menu );
                        }
                        /* Calling selected toolbar or menu item here */
                        ReturnCode = (item->func)( menu, item, 0 );

                        /* Process item function's return code here */
                        ProcessRC( menu, item, ReturnCode );
                }
                return;                 /* early return if an item hase been selected */
        }
        /* this item is not selected - get the next menu item and check it */
        item = item->nextITEM;
}

/* check the menus up and down arrow boxes if no selected item */

if( AKEmul.Cmd && !(buttons & SELECT_MASK) )
{
        AKEmul.Cmd = FALSE;
        AKEmul.Flags = 0;
        AKEmul.Time = 0;
}
else if( !AKEmul.Cmd && (buttons & SELECT_MASK) )
{
        if( menu->Attr & A_OK_CANCEL )
        {
                if( x >= menu->X1+5 && x <= menu->X2-5 )
                {
                        if( (y >= menu->Y2-M_DOWN_Y-M_INFO_Y) &&                    (y <= menu->Y2-M_INFO_Y-4) )

                        {
                                AKEmul.Cmd = VK_DOWN;
                        }
                        if( (y >= menu->Y1+M_TITLE_Y-5) && (y <= menu->Y1+M_UP_Y) )
                        {
                                if( x <= menu->X1+110 )
                                {
                                        AKEmul.Cmd = FALSE;
                                        AKEmul.Flags = 0;

                page 6
```

x.c

```
                                AKEmul.Time = 0;
                        }
                        else if( x >= menu->X2-110 )
                        {
                                AKEmul.Cmd = VK_RIGHT;
                        }
                        else
                        {
                                AKEmul.Cmd = VK_UP;
                        }
                    }
                }
            }
            else
            {
                if( x >= menu->X1+5 && x <= menu->X2-5 )
                {
                    if( (y >= menu->Y1+M_TITLE_Y+5) && (y <= menu->Y1+M_UP_Y) )
                    {
                        AKEmul.Cmd = VK_UP;
                    }
                    if( (y >= menu->Y2-M_DOWN_Y) && (y <= menu->Y2-5) )
                    {
                        AKEmul.Cmd = VK_DOWN;
                    }
                }
            }
            if( AKEmul.Cmd )
            {
                PutCmdQ( AKEmul.Cmd );
                AKEmul.Time = GPTR(_PULSE);
            }
        }
}
/* Do Overlay Draw or Erase function here if no item was selected */

if( MON_STATE & BM_DRW )
{
        if( RS232Owner == MOUSE_PORT )
        {
                if( buttons & SELECT_MASK )
                {
                        /* if DrawColor = 0, the action will be erase,
                                otherwize the action will be draw line of DrawColor color */

                        OVL.Color = DrawColor;
                        DeleteCursor();
                        FatLineTo( x, y, ((OVL.Color)?0:1) );
                        DrawCursor();
                }
                else
```

x.c

```
                        {
                                /* Move to current pointer position if button is not pressed */
                                MoveTo( x, y );
                        }
                }
        }
}

        /* Menu item functions */

/* -----------------------------------------------------------------------

        doToolBar1() - Set Toolbar Colors and action.

   ----------------------------------------------------------------------- */
int doToolBar1( void *m, ITEM *item, ushort VKey )
{
        if( !VKey )
        {
                MON_STATE &= ~BM_DRW;
                DeleteCursor();
                ClrOvlRam();
                DrawCursor();
                MGrp.FirstMenu = MGrp.ActiveMenu = &menu_main;
                InitMenuSettings();
                DrawMenus();
        }
        return( DO_NOTHING );
}
/* -----------------------------------------------------------------------

        doToolBar2() - Set Toolbar Colors and action.

   ----------------------------------------------------------------------- */
int doToolBar2( void *m, ITEM *item, ushort VKey )
{
        MENU *menu = (MENU *)m;

        if( !VKey )
        {
                MGrp.Xofs = MGrp.XPos - menu->X1;
                MGrp.Yofs = menu->Y1    - MGrp.YPos;
                MGrp.BoxX1 = menu->X1;
                MGrp.BoxY1 = menu->Y1;
                MGrp.BoxW = menu->X2 - menu->X1;
                MGrp.BoxH = menu->Y2 - menu->Y1;
                OVL.PixOp = PIX_XOR;
                OVL.Color = OVL_BLACK;
                Rectangle( MGrp.BoxX1, MGrp.BoxY1, (MGrp.BoxX1+MGrp.BoxW),                    (MGrp.BoxY1+MGrp.BoxH) );

                OVL.Color = OVL_WHITE;
                Rectangle( MGrp.BoxX1+1, MGrp.BoxY1+1, (MGrp.BoxX1+MGrp.BoxW)-1,
```

```
x.c
                                                                        (MGrp.BoxY1+MGrp.BoxH)-1 );
                OVL.PixOp = PIX_NORMAL;
        }
        return( DO_NOTHING );
}
/* ----------------------------------------------------------------------

        doToolBar3() - Set Toolbar Colors and action.

 ---------------------------------------------------------------------- */
int doToolBar3( void *m, ITEM *item, ushort VKey )
{
        MENU *menu;
        ITEM *Citem;
        short y1,y2;

        menu = (MENU *)m;

        if( !VKey )
        {
                if( !i_tb7.nextITEM )
                {
                        Citem = i_tb7.nextITEM = &i_tb8;
                        y1 = menu->Y2;
                        y2 = menu->Y2 += 75;
                        OVL.Color = MGrp.C_MenuBkg;
                        FillRect( menu->X1+1, y1, menu->X2-1, y2-1 );
                        OVL.Color = MGrp.C_MenuBorder;
                        MoveTo( menu->X1, y1 );
                        LineTo( menu->X1, y2 );
                        LineTo( menu->X2, y2 );
                        LineTo( menu->X2, y1 );
                        while( Citem )
                        {
                                DrawOneItem( menu, Citem );
                                Citem = Citem->nextITEM;
                        }
                }
                else
                {
                        i_tb7.nextITEM = (ITEM *)0;
                        menu->Y2 -= 75;
                        OVL.Color = 0;
                        FillRect( menu->X1, menu->Y2, menu->X2, menu->Y2+75 );
                        OVL.Color = MGrp.C_MenuBorder;
                        MoveTo( menu->X1, menu->Y2 );
                        LineTo( menu->X2, menu->Y2 );
                }
        }
        return( DO_NOTHING );
}
/* ----------------------------------------------------------------------
```

x.c

```
        doToolBar4() - Set Toolbar Colors and action.
-
  ------------------------------------------------------------------------ */
int doToolBar4( void *m, ITEM *item, ushort VKey )
{
        MENU *menu = (MENU *)m;
        if( !VKey )
        {
                if( menu->SelectItem != item )
                {
                        DeleteCursor();
                        DrawColor = SaveColor;
                        ItemHiliteOn( (MENU *)m, &i_tb4 );
                        ItemHiliteOff( (MENU *)m, &i_tb5 );
                        menu->SelectItem = item;
                        DrawCursor();
                }
        }
        return( DO_NOTHING );
}
/* ------------------------------------------------------------------------

        doToolBar5() - Set Toolbar Colors and action.
-
  ------------------------------------------------------------------------ */
int doToolBar5( void *m, ITEM *item, ushort VKey )
{
        MENU *menu = (MENU *)m;
        if( !VKey )
        {
                if( menu->SelectItem != item )
                {
                        DeleteCursor();
                        SaveColor = DrawColor;
                        DrawColor = 0;
                        ItemHiliteOff( (MENU *)m, &i_tb4 );
                        ItemHiliteOn( (MENU *)m, &i_tb5 );
                        menu->SelectItem = item;
                        DrawCursor();
                }
        }
        return( DO_NOTHING );
}
/* ------------------------------------------------------------------------

        doToolBar6() - Set Toolbar Colors and action.
-
  ------------------------------------------------------------------------ */
int doToolBar6( void *m, ITEM *item, ushort VKey )
{
        if( !VKey )
```

```
        {
                OVL.Color = 0;
                FillRect( 0, 0, 1023, ((MENU *)m)->Y1-1);
                FillRect( 0, ((MENU *)m)->Y1, ((MENU *)m)->X1-1, ((MENU *)m)->Y2 );
                FillRect( ((MENU *)m)->X2+1, ((MENU *)m)->Y1, 1023, ((MENU *)m)->Y2 );
                FillRect( 0, ((MENU *)m)->Y2+1, 1023, 767 );
        }
        return( DO_NOTHING );
}
/* ----------------------------------------------------------------------------

        doToolBar7() - Set Toolbar Colors and action.

   ---------------------------------------------------------------------------- */
int doToolBar7( void *m, ITEM *item, ushort VKey )
{
        MENU *menu;
        ITEM *Citem;
        short y1, y2;

        menu = (MENU *)m;
        if( !VKey )
        {
                if( !i_tb7.nextITEM )
                {
                        Citem = i_tb7.nextITEM = &i_tb8;
                        y1 = menu->Y2;
                        y2 = menu->Y2 += 75;
                        OVL.Color = MGrp.C_MenuBkg;
                        FillRect( menu->X1+1, y1, menu->X2-1, y2-1 );
                        OVL.Color = MGrp.C_MenuBorder;
                        MoveTo( menu->X1, y1 );
                        LineTo( menu->X1, y2 );
                        LineTo( menu->X2, y2 );
                        LineTo( menu->X2, y1 );
                        while( Citem )
                        {
                                DrawOneItem( menu, Citem );
                                Citem = Citem->nextITEM;
                        }
                }
        }
        return( DO_NOTHING );
}
/* ----------------------------------------------------------------------------

        doToolBar8() - Set Toolbar Colors and action.

   ---------------------------------------------------------------------------- */
int doToolBar8( void *m, ITEM *item, ushort VKey )
{
        if( !VKey )
```

x.c

```
	{
		i_tb7.Icon = TBar1;
		if(DrawColor)
			DrawColor = OVL_WHITE;
		else
			SaveColor = OVL_WHITE;
		DrawOneItem( (MENU *)m, &i_tb7 );
	}
	return( DO_NOTHING );
}
/* ------------------------------------------------------------------------

	doToolBar9() - Set Toolbar Colors and action.
-
  ------------------------------------------------------------------------ */
int doToolBar9( void *m, ITEM *item, ushort VKey )
{
	if( !VKey )
	{
		i_tb7.Icon = TBar2;
		if(DrawColor)
			DrawColor = OVL_RED;
		else
			SaveColor = OVL_RED;
		DrawOneItem( (MENU *)m, &i_tb7 );
	}
	return( DO_NOTHING );
}
/* ------------------------------------------------------------------------

	doToolBar10() - Set Toolbar Colors and action.
-
  ------------------------------------------------------------------------ */
int doToolBar10( void *m, ITEM *item, ushort VKey )
{
	if( !VKey )
	{
		i_tb7.Icon = TBar3;
		if(DrawColor)
			DrawColor = OVL_GREEN;
		else
			SaveColor = OVL_GREEN;
		DrawOneItem( (MENU *)m, &i_tb7 );
	}
	return( DO_NOTHING );
}
/* ------------------------------------------------------------------------

	doToolBar11() - Set Toolbar Colors and action.
-
  ------------------------------------------------------------------------ */
int doToolBar11( void *m, ITEM *item, ushort VKey )
```

```
{
        if( !VKey )
        {
                i_tb7.Icon = TBar4;
                if(DrawColor)
                        DrawColor = OVL_BLUE;
                else
                        SaveColor = OVL_BLUE;
                DrawOneItem( (MENU *)m, &i_tb7 );
        }
        return( DO_NOTHING );
}
/* ------------------------------------------------------------------------

        doToolBar12() - Set Toolbar Colors and action.

   ------------------------------------------------------------------------ */
int doToolBar12( void *m, ITEM *item, ushort VKey )
{
        if( !VKey )
        {
                i_tb7.Icon = TBar5;
                if(DrawColor)
                        DrawColor = OVL_CYAN;
                else
                        SaveColor = OVL_CYAN;
                DrawOneItem( (MENU *)m, &i_tb7 );
        }
        return( DO_NOTHING );
}
/* ------------------------------------------------------------------------

        doToolBar13() - Set Toolbar Colors and action.

   ------------------------------------------------------------------------ */
int doToolBar13( void *m, ITEM *item, ushort VKey )
{
        if( !VKey )
        {
                i_tb7.Icon = TBar6;
                if(DrawColor)
                        DrawColor = OVL_MAGENTA;
                else
                        SaveColor = OVL_MAGENTA;
                DrawOneItem( (MENU *)m, &i_tb7 );
        }
        return( DO_NOTHING );
}
/* ------------------------------------------------------------------------

        doToolBar14() - Set Toolbar Colors and action.
```

```
--------------------------------------------------------------------------- */
int doToolBar14( void *m, ITEM *item, ushort VKey )
{
        if( !VKey )
        {
                i_tb7.Icon = TBar9;
                if(DrawColor)
                        DrawColor = OVL_YELLOW;
                else
                        SaveColor = OVL_YELLOW;
                DrawOneItem( (MENU *)m, &i_tb7 );
        }
        return( DO_NOTHING );
}
/* ---------------------------------------------------------------------------

        doToolBar15() - Set Toolbar Colors and action.

--------------------------------------------------------------------------- */
int doToolBar15( void *m, ITEM *item, ushort VKey )
{
        if( !VKey )
        {
                i_tb7.Icon = TBar10;
                if(DrawColor)
                        DrawColor = OVL_BLACK;
                else
                        SaveColor = OVL_BLACK;
                DrawOneItem( (MENU *)m, &i_tb7 );
        }
        return( DO_NOTHING );
}
/* ---------------------------------------------------------------------------

        doDraw() - Set Toolbar to Draw.

--------------------------------------------------------------------------- */
int doDraw( void *m, ITEM *item, ushort VKey )
{
        if( VKey == VK_SET )
        {
                if( MON_STATE & BM_DRW )
                {
                        ((MENU *)m)->SelectItem = item;
                }
        }
        else
        {
                MON_STATE |= BM_DRW;
                EraseMenus( MGrp.FirstMenu );
                MGrp.FirstMenu = MGrp.ActiveMenu = &Mtbar;
                i_tb7.Icon = TBar1;
```

```
x.c

                SaveColor = DrawColor = OVL_WHITE;
                ItemHiliteOn( &Mtbar, &i_tb4 );
                Mtbar.SelectItem = &i_tb4;
                DrawOneMenu( &Mtbar );
        }
        return( DO_NOTHING );
}


        /* Toolbar icon definitions (nwicons.c) */

const ICON TBarClose[] = {
        10, 10,
        0,         0,
        0xff,0xff,0xff,0xff,0xff,
        0xff,0xff,0xff,0xff,0xff,
        0xff,0xff,0xff,0xff,0xff,
        0xff,0xff,0xff,0xff,0xff,
        0xff,0xff,0xff,0xff,0xff,
        0xff,0xff,0xff,0xff,0xff,
        0xff,0xff,0xff,0xff,0xff,
        0xff,0xff,0xff,0xff,0xff,
        0xff,0xff,0xff,0xff,0xff,
        0xff,0xff,0xff,0xff,0xff };

const ICON TBarExpand[] = {
        10, 10,
        0,         0,

        0x00,0x00,0xf0,0x00,0x00,
        0x00,0x00,0xf0,0x00,0x00,
        0x00,0x0f,0xff,0x00,0x00,
        0x00,0x0f,0xff,0x00,0x00,
        0x00,0xff,0xff,0xf0,0x00,
        0x00,0xff,0xff,0xf0,0x00,
        0x0f,0xff,0xff,0xff,0x00,
        0x0f,0xff,0xff,0xff,0x00,
        0xff,0xff,0xff,0xff,0xf0,
        0xff,0xff,0xff,0xff,0xf0 };

const ICON TBar1[] = {
        30, 30,
        0,         0,

0xff,0xff,0xff,0xff,0xff,0xff,0xff,0xff,0xff,0xff,0xff,0xff,0xff,0xff,0xff,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
```

x.c

```
Oxf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xff,0xff,0xff,0xff,0xff,0xff,0xff,0xff,0xff,0xff,0xff,0xff,0xff,0xff,0xff );

const ICON TBar2[] = (
        30, 30,
        0,         0,

0xff,0xff,0xff,0xff,0xff,0xff,0xff,0xff,0xff,0xff,0xff,0xff,0xff,0xff,0xff,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
```

x.c

```
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xf9,0x99,0x99,0x99,0x99,0x99,0x99,0x99,0x99,0x99,0x99,0x99,0x99,0x99,0x9f,
0xff,0xff,0xff,0xff,0xff,0xff,0xff,0xff,0xff,0xff,0xff,0xff,0xff,0xff,0xff );

const ICON TBar3[] = {
        30, 30,
        0,       0,

0xff,0xff,0xff,0xff,0xff,0xff,0xff,0xff,0xff,0xff,0xff,0xff,0xff,0xff,0xff,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xfa,0xaa,0xaa,0xaa,0xaa,0xaa,0xaa,0xaa,0xaa,0xaa,0xaa,0xaa,0xaa,0xaa,0xaf,
0xff,0xff,0xff,0xff,0xff,0xff,0xff,0xff,0xff,0xff,0xff,0xff,0xff,0xff,0xff );

const ICON TBar4[] = {
        30, 30,
        0,       0,

0xff,0xff,0xff,0xff,0xff,0xff,0xff,0xff,0xff,0xff,0xff,0xff,0xff,0xff,0xff,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
```

x.c

```
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xfb,0xbb,0xbb,0xbb,0xbb,0xbb,0xbb,0xbb,0xbb,0xbb,0xbb,0xbb,0xbb,0xbb,0xbf,
0xff,0xff,0xff,0xff,0xff,0xff,0xff,0xff,0xff,0xff,0xff,0xff,0xff,0xff,0xff };

const ICON TBar5[] = {
        30, 30,
        0,        0,

0xff,0xff,0xff,0xff,0xff,0xff,0xff,0xff,0xff,0xff,0xff,0xff,0xff,0xff,0xff,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
```

```
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xf7,0x77,0x77,0x77,0x77,0x77,0x77,0x77,0x77,0x77,0x77,0x77,0x77,0x77,0x7f,
0xff,0xff,0xff,0xff,0xff,0xff,0xff,0xff,0xff,0xff,0xff,0xff,0xff,0xff,0xff };

const ICON TBar6[] = {
        30, 30,
        0,        0,

0xff,0xff,0xff,0xff,0xff,0xff,0xff,0xff,0xff,0xff,0xff,0xff,0xff,0xff,0xff,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xf8,0x88,0x88,0x88,0x88,0x88,0x88,0x88,0x88,0x88,0x88,0x88,0x88,0x88,0x8f,
0xff,0xff,0xff,0xff,0xff,0xff,0xff,0xff,0xff,0xff,0xff,0xff,0xff,0xff,0xff };

const ICON TBar7[] = {
        30, 30,
        0,        0,

0xff,0xff,0xff,0xff,0xff,0xff,0xff,0xff,0xff,0xff,0xff,0xff,0xff,0xff,0xff,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
```

x.c

```
Oxf1,0x1f,0x11,0x11,0x11,0x11,0x11,0x11,0x11,0x11,0x11,0x11,0x11,0x11,0x1f,
0xf1,0x11,0xff,0xff,0xff,0xf1,0x11,0x11,0x11,0x11,0x11,0x11,0x11,0x11,0x1f,
0xf1,0x11,0xf1,0x11,0x1f,0xff,0x11,0x11,0x11,0x11,0x11,0x11,0x11,0x11,0x1f,
0xf1,0x11,0xf1,0x11,0x1f,0xcf,0xf1,0x11,0x11,0x11,0x11,0x11,0x11,0x11,0x1f,
0xf1,0x11,0xf1,0x11,0xfc,0xcc,0xff,0x11,0x11,0x11,0x11,0x11,0x11,0x11,0x1f,
0xf1,0x11,0xf1,0xff,0xfc,0xcc,0xcf,0xf1,0x11,0x11,0x11,0x11,0x11,0x11,0x1f,
0xf1,0x11,0xff,0xfc,0xcf,0xcc,0xcc,0xff,0x11,0x11,0x11,0x11,0x11,0x11,0x1f,
0xf1,0x11,0xff,0xcc,0xcc,0xfc,0xcc,0xcf,0xf1,0x11,0x11,0x11,0x11,0x11,0x1f,
0xf1,0x11,0x1f,0xfc,0xcc,0xcf,0xcc,0xcc,0xff,0x11,0x11,0x11,0x11,0x11,0x1f,
0xf1,0x11,0x11,0xff,0xcc,0xcc,0xfc,0xcc,0xcf,0xf1,0x11,0x11,0x11,0x11,0x1f,
0xf1,0x11,0x11,0x1f,0xfc,0xcc,0xcf,0xcc,0xcc,0xff,0x11,0x11,0x11,0x11,0x1f,
0xf1,0x11,0x11,0x11,0xff,0xcc,0xcc,0xfc,0xcc,0xcf,0xf1,0x11,0x11,0x11,0x1f,
0xf1,0x11,0x11,0x11,0x1f,0xfc,0xcc,0xcf,0xcc,0xcc,0xff,0x11,0x11,0x11,0x1f,
0xf1,0x11,0x11,0x11,0x11,0xff,0xcc,0xcc,0xfc,0xcc,0xcf,0xf1,0x11,0x11,0x1f,
0xf1,0x11,0x11,0x11,0x11,0x1f,0xfc,0xcc,0xcf,0xcc,0xcc,0xff,0x11,0x11,0x1f,
0xf1,0x11,0x11,0x11,0x11,0x11,0xff,0xcc,0xcc,0xfc,0xcc,0xcf,0xf1,0x11,0x1f,
0xf1,0x11,0x11,0x11,0x11,0x11,0x1f,0xfc,0xcc,0xcf,0xcc,0xcc,0xff,0x11,0x1f,
0xf1,0x11,0x11,0x11,0x11,0x11,0x11,0xff,0xcc,0xcc,0xfc,0xcc,0xcf,0xf1,0x1f,
0xf1,0x11,0x11,0x11,0x11,0x11,0x11,0x1f,0xfc,0xcc,0xcf,0xcc,0xcc,0xf1,0x1f,
0xf1,0x11,0x11,0x11,0x11,0x11,0x11,0x11,0xff,0xcc,0xcc,0xfc,0xcc,0xc1,0x1f,
0xf1,0x11,0x11,0x11,0x11,0x11,0x11,0x11,0x1f,0xfc,0xcc,0xcf,0xcc,0xc1,0x1f,
0xf1,0x11,0x11,0x11,0x11,0x11,0x11,0x11,0x11,0xff,0xcc,0xcc,0xfc,0xc1,0x1f,
0xf1,0x11,0x11,0x11,0x11,0x11,0x11,0x11,0x11,0x1f,0xfc,0xcc,0xcf,0x11,0x1f,
0xf1,0x11,0x11,0x11,0x11,0x11,0x11,0x11,0x11,0x11,0xff,0xcc,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xff,0xff,0xff,0xff,0xff,0xff,0xff,0xff,0xff,0xff,0xff,0xff,0xff,0xff,0xff };

const ICON TBar8[] = {
        30, 30,
        0,        0,

0xff,0xff,0xff,0xff,0xff,0xff,0xff,0xff,0xff,0xff,0xff,0xff,0xff,0xff,0xff,
0xf1,0x11,0x11,0x11,0x11,0x11,0x11,0x11,0x11,0x11,0x11,0x11,0x11,0x11,0x1f,
0xf1,0x11,0x11,0xff,0xf1,0x11,0x11,0x11,0x11,0x11,0x11,0x11,0x11,0x11,0x1f,
0xf1,0x11,0x1f,0xf9,0xff,0x11,0x11,0x11,0x11,0x11,0x11,0x11,0x11,0x11,0x1f,
0xf1,0x11,0xff,0x99,0x9f,0xf1,0x11,0x11,0x11,0x11,0x11,0x11,0x11,0x11,0x1f,
0xf1,0x1f,0xf9,0x99,0x99,0xff,0x11,0x11,0x11,0x11,0x11,0x11,0x11,0x11,0x1f,
0xf1,0xff,0x99,0x99,0x99,0x9f,0xf1,0x11,0x11,0x11,0x11,0x11,0x11,0x11,0x1f,
0xf1,0xf9,0x99,0x99,0x99,0xf1,0xff,0x11,0x11,0x11,0x11,0x11,0x11,0x11,0x1f,
0xf1,0xff,0x99,0x99,0x9f,0x11,0xff,0xf1,0x11,0x11,0x11,0x11,0x11,0x11,0x1f,
0xf1,0x1f,0xf9,0x99,0xf1,0x1f,0x11,0xff,0x11,0x11,0x11,0x11,0x11,0x11,0x1f,
0xf1,0x11,0xff,0x9f,0x11,0xf1,0x1f,0xcf,0xf1,0x11,0x11,0x11,0x11,0x11,0x1f,
0xf1,0x11,0x1f,0xf1,0x1f,0x11,0xfc,0xcc,0xff,0x11,0x11,0x11,0x11,0x11,0x1f,
0xf1,0x11,0x11,0xff,0xf1,0x1f,0xfc,0xcc,0xcf,0xf1,0x11,0x11,0x11,0x11,0x1f,
0xf1,0x11,0x11,0x1f,0xf1,0xfc,0xcf,0xcc,0xcc,0xff,0x11,0x11,0x11,0x11,0x1f,
0xf1,0x11,0x11,0x11,0xff,0xcc,0xcc,0xfc,0xcc,0xcf,0xf1,0x11,0x11,0x11,0x1f,
0xf1,0x11,0x11,0x11,0x1f,0xfc,0xcc,0xcf,0xcc,0xcc,0xff,0x11,0x11,0x11,0x1f,
0xf1,0x11,0x11,0x11,0x11,0xff,0xcc,0xcc,0xfc,0xcc,0xcf,0xf1,0x11,0x11,0x1f,
0xf1,0x11,0x11,0x11,0x11,0x1f,0xfc,0xcc,0xcf,0xcc,0xcc,0xff,0x11,0x11,0x1f,
0xf1,0x11,0x11,0x11,0x11,0x11,0xff,0xcc,0xcc,0xfc,0xcc,0xcf,0xf1,0x11,0x1f,
0xf1,0x11,0x11,0x11,0x11,0x11,0x1f,0xfc,0xcc,0xcf,0xcc,0xcc,0xff,0x11,0x1f,
```

```
0xf1,0x11,0x11,0x11,0x11,0x11,0x11,0xff,0xcc,0xcc,0xfc,0xcc,0xcf,0xf1,0x1f,
0xf1,0x11,0x11,0x11,0x11,0x11,0x11,0x1f,0xfc,0xcc,0xcf,0xcc,0xcc,0xff,0x1f,
0xf1,0x11,0x11,0x11,0x11,0x11,0x11,0x11,0xff,0xcc,0xcc,0xfc,0xcc,0x11,0x1f,
0xf1,0x11,0x11,0x11,0x11,0x11,0x11,0x11,0x1f,0xfc,0xcc,0xcf,0xc1,0x11,0x1f,
0xf1,0x11,0x11,0x11,0x11,0x11,0x11,0x11,0x11,0xff,0xcc,0xcc,0xf1,0x11,0x1f,
0xf1,0x11,0x11,0x11,0x11,0x11,0x11,0x11,0x11,0x1f,0xfc,0xc1,0x1f,0x11,0x1f,
0xf1,0x11,0x11,0x11,0x11,0x11,0x11,0x11,0x11,0x11,0xff,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xff,0xff,0xff,0xff,0xff,0xff,0xff,0xff,0xff,0xff,0xff,0xff,0xff,0xff,0xff };

const ICON TBar9[] = {
        30, 30,
        0,      0,

0xff,0xff,0xff,0xff,0xff,0xff,0xff,0xff,0xff,0xff,0xff,0xff,0xff,0xff,0xff,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xfc,0xcc,0xcc,0xcc,0xcc,0xcc,0xcc,0xcc,0xcc,0xcc,0xcc,0xcc,0xcc,0xcc,0xcf,
0xff,0xff,0xff,0xff,0xff,0xff,0xff,0xff,0xff,0xff,0xff,0xff,0xff,0xff,0xff };

const ICON TBar10[] = {
        30, 30,
        0,      0,
```

x.c

```
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff,
0xff,0xff,0xff,0xff,0xff,0xff,0xff,0xff,0xff,0xff,0xff,0xff,0xff,0xff,0xff };

const ICON TBarClear[] = {
        30, 30,
        0,       0,

0xff,0xff,0xff,0xff,0xff,0xff,0xff,0xff,0xff,0xff,0xff,0xff,0xff,0xff,0xff,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x1f,0xff,0xff,0xff,0xff,0xff,0xff,0xff,0xff,0xff,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
```

X.c

```
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0x11,0x11,0x11,0x11,0x11,0x11,0x11,0x11,0x11,0xf1,0x11,0x1f,
0xf1,0x11,0x1f,0xff,0xff,0xf1,0x11,0x11,0x11,0x11,0x11,0x11,0xf1,0x11,0x1f,
0xf1,0x11,0x1f,0x11,0x11,0xf1,0x11,0x11,0x11,0x11,0x11,0x11,0xf1,0x11,0x1f,
0xf1,0x11,0x11,0xf1,0x11,0xf1,0x11,0x11,0x11,0x11,0x11,0x11,0xf1,0x11,0x1f,
0xf1,0x11,0x11,0x1f,0x11,0xf1,0x11,0x11,0x11,0x11,0x11,0x11,0xf1,0x11,0x1f,
0xf1,0x11,0x11,0x11,0xf1,0xf1,0x11,0x11,0x11,0x11,0x11,0x11,0xf1,0x11,0x1f,
0xf1,0x11,0x11,0x11,0x1f,0xf1,0x11,0x11,0x11,0x11,0xf1,0x11,0xf1,0x11,0x1f,
0xf1,0x11,0x11,0x11,0x11,0xf1,0x11,0x11,0x11,0x11,0x11,0x11,0xf1,0x11,0x1f,
0xf1,0x11,0x11,0x11,0x11,0x1f,0xff,0xff,0xff,0xff,0xff,0xff,0xf1,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xf1,0x11,0x11,0x11,0x11,0x11,0x11,0x11,0x11,0x11,0x11,0x11,0x11,0x11,0x1f,
0xff,0xff,0xff,0xff,0xff,0xff,0xff,0xff,0xff,0xff,0xff,0xff,0xff,0xff,0xff };


const ICON Cursor[] = {
 18, 18,
  0,  0,
0x00,0x00,0x00,0x00,0xf1,0x00,0x00,0x00,0x00,
0x00,0x00,0x00,0x00,0xf1,0x00,0x00,0x00,0x00,
0x00,0x00,0x00,0x00,0xf1,0x00,0x00,0x00,0x00,
0x00,0x00,0x00,0x00,0xf1,0x00,0x00,0x00,0x00,
0x00,0x00,0x00,0x00,0xf1,0x00,0x00,0x00,0x00,
0x00,0x00,0x00,0x00,0xf1,0x00,0x00,0x00,0x00,
0x00,0x00,0x00,0x00,0xf1,0x00,0x00,0x00,0x00,
0x00,0x00,0x00,0x00,0xf1,0x00,0x00,0x00,0x00,
0x11,0x11,0x11,0x11,0xff,0xff,0xff,0xff,0xff,
0xff,0xff,0xff,0xff,0xff,0x11,0x11,0x11,0x11,
0x00,0x00,0x00,0x00,0x1f,0x00,0x00,0x00,0x00,
0x00,0x00,0x00,0x00,0x1f,0x00,0x00,0x00,0x00,
0x00,0x00,0x00,0x00,0x1f,0x00,0x00,0x00,0x00,
0x00,0x00,0x00,0x00,0x1f,0x00,0x00,0x00,0x00,
0x00,0x00,0x00,0x00,0x1f,0x00,0x00,0x00,0x00,
0x00,0x00,0x00,0x00,0x1f,0x00,0x00,0x00,0x00,
0x00,0x00,0x00,0x00,0x1f,0x00,0x00,0x00,0x00,
0x00,0x00,0x00,0x00,0x1f,0x00,0x00,0x00,0x00 };
```

page 23

What is claimed is:

1. A display control system, comprising:

accentuating means responsive to a detected spot of light directed by a user along a user selected path corresponding to a selected portion of a projected primary video image displayed on a remote viewing surface for generating an accentuating image information indicative of an accentuating image to be displayed in place of the user selected portion of the primary video image;

bit map memory means for storing and retrieving primary video information indicative of said primary video image and for storing and retrieving the accentuating image information to facilitate displaying the accentuating image on said primary video image;

said bit map memory means includes an overlay bit map memory means for storing said accentuating image information continuously as the user directs said spot of light along said path to enable said accentuating image to replace said selected portion for simulating said path on said primary video image as said accentuating image;

said retrieving of the accentuating image information being retrieved from said overlay bit map memory means in synchronization with the primary video information corresponding to the user selected portion of primary video image to facilitate the accentuating image replacing the selected portion of said primary video image;

means responsive to said bit map memory means and to said accentuating means for supplying to a projection display unit the retrieved accentuating image information indicative of an accentuating video image and for supplying to the projection display unit in the absence of retrieved accentuating image information indicative of said accentuating video image, the retrieved primary video information indicative of the unselected portions of the primary video image;

control means coupled to said accentuating means for selectively causing said overlay bit map memory means to begin storing said accentuating image information and for selectively causing said overlay bit map memory means to stop storing said accentuating image information to enable said accentuating image to be selectively defined; and whereby the projection display unit generates and projects the primary video image onto the remote viewing surface with user selected portions thereof being replaced with accentuating images to help facilitate audience presentations.

2. An information input arrangement for use with a computer system having a central processor for generating primary video information, an auxiliary light device for generating auxiliary light information indicative of a path traversed by an auxiliary light on a projected primary video image, a control device for entering control information to effect the display of desired video information, and a projection display unit for generating and projecting the primary video image onto a remote viewing surface, comprising:

bit map memory means responsive to the primary video information for storing and retrieving it to facilitate displaying the primary video image onto said remote viewing surface;

information control means responsive to the control information for generating display command signals to control the display of the desired video information;

said bit mar memory means including overlay bit map memory means responsive to said auxiliary light information and to said display command signals for storing the auxiliary light information and retrieving it in synchronization with the retrieval of the primary video information stored in said bit map memory means to facilitate displaying an auxiliary video image onto said remote viewing surface;

wherein said overlay bit map memory means stores said auxiliary light information continuously as said auxiliary light traverses said path on said primary video image to enable said path to be reproduced as said accentuating video image within said primary video image;

means responsive to said bit map memory means and to said accentuating means for supplying to the projection display unit retrieved auxiliary light information indicative of an accentuating video image and for supplying to the projection display unit in the absence of retrieved auxiliary light information indicative of said accentuating video image, retrieved primary video information indicative of the primary video image;

said display command signals including an activation signal for selectively causing said overlay bit map memory means to begin storing said auxiliary light information and for selectively causing said overlay bit map memory means to stop storing said auxiliary light information to enable said accentuating video image to be selectively defined; and whereby the projection display unit generates and projects the primary video image onto the remote viewing surface with user selected portions thereof being replaced with accentuating images to help facilitate audience presentations.

3. An information input arrangement according to claim 2, further comprising:

color selection means responsive to certain ones of said display command signals for storing color selection information indicative of the color appearance of the accentuating images.

4. An information input arrangement according to claim 2, wherein said display command signals include a color select command to enable the accentuating images to be displayed in one of N number of different colors.

5. An information input arrangement according to claim 4, wherein the N number of different colors is about eight different colors.

6. An information input arrangement according to claim 2, wherein said activation signal includes a draw command signal to enable user selected portions of the primary image to be accentuated with at least one accentuating image.

7. An information input arrangement according to claim 2, wherein said computer system includes a computer mouse for generating control information to effect the display of desired video information and wherein said accentuating means includes microprocessor means having an interface for receiving the control information generated by said computer mouse.

8. An information input arrangement according to claim 2, wherein said computer system includes a keyboard for generating control information to effect display of desired video information and wherein said accentuating means includes microprocessor means having an interface for receiving the control information generated by said keyboard.

9. A method of controlling the display of a projected primary video image displayed upon a remote viewing surface, comprising:

detecting an auxiliary light traversing a selected path to generate auxiliary light information corresponding to said path;

generating display command signals to control the display of desired video information;

storing primary video information in frame buffer bit map memory means;

retrieving the stored primary video information from said frame buffer bit map memory means;

storing in overlay bit map memory means auxiliary light information indicative of at least one accentuating video image;

said storing including storing said auxiliary light information continuously as said auxiliary light traverses said path for simulating said path on said primary video image as said accentuating image;

retrieving the stored auxiliary light information from said overlay bit map memory means in synchronization with the retrieval of the stored primary video information in said frame buffer bit map memory means;

said generating display command signals including generating an activation signal for selectively causing said overlay bit map memory means to begin storing said auxiliary light information and for selectively causing said overlay bit map memory means to stop storing said auxiliary light information to enable said accentuating video image to be selectively defined;

supplying to a projection display unit retrieved auxiliary light information indicative of an accentuating video image; and supplying to the projection display unit in the absence of retrieved auxiliary light information indicative of said accentuating video image, retrieved primary video information indicative of the primary video image.

10. A method of controlling a display system, comprising:

projecting a primary video image onto a remote viewing surface as a projected primary video image;

detecting a spot of light directed by a user along a user selected path on said projected primary video image displayed on said remote viewing surface;

generating accentuating image information in response to the detected spot of light, said accentuating image information indicative of said user selected path relative to the projected primary video image;

storing and retrieving primary video information indicative of said primary video image;

storing and retrieving the accentuating image information;

modifying said primary video image to project a modified primary video image including an accentuating image corresponding to said user selected path instead of projecting said primary video image;

said storing of the accentuating image information including storing said accentuating image information continuously as the user directs said spot of light along said path to enable said accentuating image to simulate said path as a part of said modified primary video image;

selectively initiating the storage of said accentuating image information;

selectively terminating the storage of said accentuating image information to enable said accentuating image to be selectively defined;

said retrieving of the accentuating image information being retrieved in synchronization with the retrieving of the primary video information to facilitate incorporating the accentuating image into said projected primary video image;

supplying to a projection display unit the retrieved accentuating image information;

supplying selectively to the projection display unit the retrieved primary video information and said retrieved primary video information for combining selectively said primary video information and said accentuating image information to generate said modified primary video image; and whereby the projection display unit generates and projects the modified primary video image as said protected primary video image onto the remote viewing surface with said primary video image being replaced with said modified primary video image including said accentuating image simulating said user selected path to help facilitate audience presentations.

11. A display system, comprising:

means for projecting a primary image onto a viewing surface as a projected primary image;

means for detecting an auxiliary control light image directed along a user selected path on the projected primary image;

means for generating image accentuation information indicative of said user selected path traversed by said auxiliary light image relative to said projected primary image;

means for storing said image accentuation information;

means for storing primary image information indicative of said primary image;

means for initiating the storage of said image accentuation information;

means for terminating the storage of said image accentuation information to enable said image accentuation information to be selectively defined;

means responsive to said stored image accentuation information for modifying the primary image to a modified primary image to simulate the auxiliary light image path as an accentuating image incorporated into the projected primary image for accentuating a desired portion of said projected primary image, wherein said modified primary image is projected as said projected primary image instead of said primary image; and said means for modifying including means for retrieving selectively said image accentuation information and said primary image information to enable said image accentuation information to replace primary image information corresponding to said user selected path.

12. A method of controlling display information projected onto a remote viewing surface, comprising:

projecting a primary image onto the remote viewing surface as a projected primary image;

detecting an auxiliary control light image directed along a user selected path on the projected primary image;

generating image accentuation information indicative of said user selected path traversed by said auxiliary light image relative to said projected primary image;

storing said image accentuation information;

storing primary image information indicative of said primary image;

initiating the storage of said image accentuation information;

terminating the storage of said image accentuation information to enable said image accentuation information to be selectively defined;

modifying the primary image to a modified primary image in response to said stored image accentuation information to simulate the auxiliary light image path as an accentuating image incorporated into the projected primary image for accentuating a desired portion of said projected primary image;

projecting said modified primary image as said projected primary image instead of said primary image; and retrieving selectively said image accentuation information and said primary image information to enable said image accentuation information to replace primary image information corresponding to said user selected path.

* * * * *